US008797475B2

(12) United States Patent
Kuromizu

(10) Patent No.: US 8,797,475 B2
(45) Date of Patent: Aug. 5, 2014

(54) LIGHTING DEVICE, DISPLAY DEVICE AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 355 days.

(21) Appl. No.: 13/375,552

(22) PCT Filed: Apr. 6, 2010

(86) PCT No.: PCT/JP2010/056210
§ 371 (c)(1),
(2), (4) Date: Dec. 1, 2011

(87) PCT Pub. No.: WO2010/146916
PCT Pub. Date: Dec. 23, 2010

(65) Prior Publication Data
US 2012/0075551 A1   Mar. 29, 2012

(30) Foreign Application Priority Data

Jun. 15, 2009   (JP) ................................. 2009-142388

(51) Int. Cl.
*G02F 1/13357* (2006.01)
(52) U.S. Cl.
USPC ................................. 349/58; 349/61; 362/97.3
(58) Field of Classification Search
None
See application file for complete search history.

(56) References Cited

U.S. PATENT DOCUMENTS

| | | | | |
|---|---|---|---|---|
| 2006/0002151 A1* | 1/2006 | Park | ............................... | 362/631 |
| 2007/0019419 A1* | 1/2007 | Hafuka et al. | ................. | 362/373 |
| 2007/0103908 A1* | 5/2007 | Tabito et al. | ................... | 362/294 |
| 2007/0121318 A1* | 5/2007 | Nanbu | ........................... | 362/228 |
| 2008/0106897 A1* | 5/2008 | Yoon et al. | ..................... | 362/235 |
| 2008/0303977 A1* | 12/2008 | Sekiguchi et al. | .............. | 349/64 |
| 2009/0154139 A1* | 6/2009 | Shin | ............................. | 362/97.1 |
| 2010/0008066 A1* | 1/2010 | Moro et al. | ................... | 362/97.1 |
| 2012/0075550 A1* | 3/2012 | Kuromizu | ....................... | 349/61 |

FOREIGN PATENT DOCUMENTS

| | | |
|---|---|---|
| JP | 2007-317423 A | 12/2007 |
| JP | 2008-71586 A | 3/2008 |
| JP | 2009-87879 A | 4/2009 |

OTHER PUBLICATIONS

English version of written opinion for PCT/JP2010/056210, mailing date Jul. 13, 2010.*
Official Communication issued in International Patent Application No. PCT/JP2010/056210, mailed on Jul. 13, 2010.
Kuromizu, "Lighting Device, Display Device and Television Receiver", U.S. Appl. No. 13/375,549, filed Dec. 1, 2011.
Yoshikawa, "Lighting Device, Display Device and Television Receiver", U.S. Appl. No. 13/375,547, filed Dec. 1, 2011.

* cited by examiner

*Primary Examiner* — Mike Stahl
(74) *Attorney, Agent, or Firm* — Keating & Bennett, LLP

(57) ABSTRACT

An object of the present invention is to reduce its tendency to generate local deformation in an extending member of a backlight unit. A backlight unit 12 according to the present invention includes LEDs 17 as light sources, a chassis 14 storing the LEDs 17, a reflection sheet 21 and an LED substrate 18 that are extending members along an inner surface of the chassis 14, a holding member 20 fixed to the chassis 14 and holding the reflection sheet 21 and the LED substrate 18 with the chassis 14 such that the reflection sheet 21 and the LED substrate 18 are sandwiched between the holding member 20 and the chassis 14, and a restricting part 26 restricting positional relationship of the holding member 20 with respect to the reflection sheet 21 and the LED substrate 18 such that a gap C is provided between the holding member 20 and the reflection sheet 21.

3 Claims, 28 Drawing Sheets

FIG.1
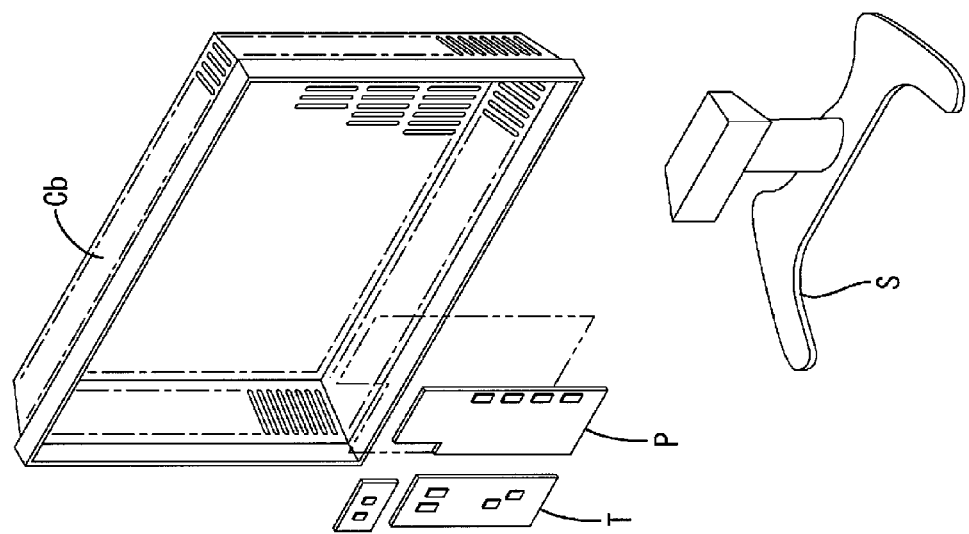
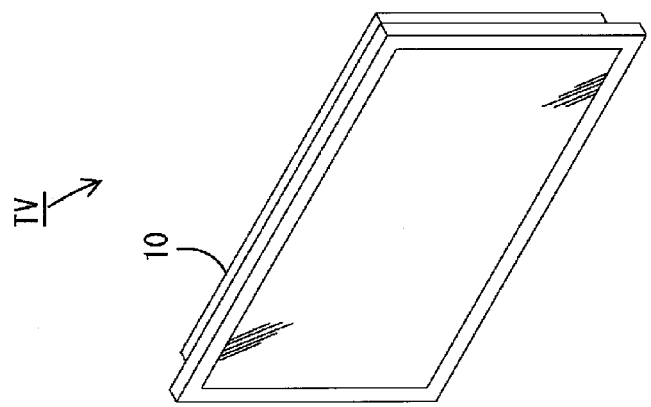
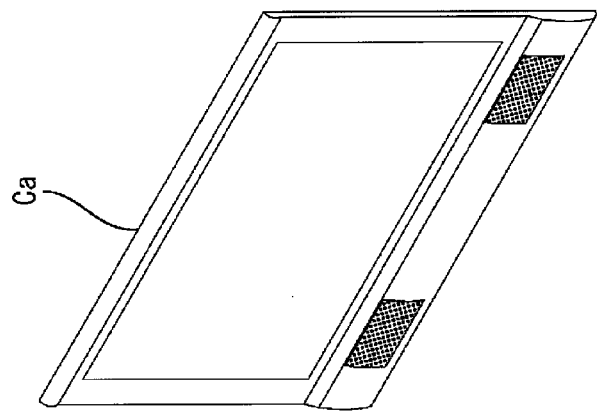

LIGHTING DEVICE, DISPLAY DEVICE AND TELEVISION RECEIVER

TECHNICAL FIELD

The present invention relates to a lighting device, a display device and a television receiver.

BACKGROUND ART

For example, a liquid crystal panel used for a liquid crystal display device such as a liquid crystal television set does not emit light by itself, and therefore, requires a separate backlight unit as a lighting device. The backlight unit is installed on a back side of the liquid crystal panel (side opposite to a display surface) and includes a chassis, a surface of which is opened on the side of the liquid crystal panel, a light source stored in the chassis, a reflection sheet that is arranged along an inner surface of the chassis and reflects light on the side of the opening of the chassis, and an optical member (diffuser sheet, etc.) that is arranged on the opening side of the chassis and efficiently discharges light emitted from the light source to the liquid crystal panel. Among the above-mentioned constituents of the backlight unit, the light source adopts, for example, an LED, and in such case, an LED substrate that mounts the LED thereon is stored in the chassis.

An example of the backlight unit using the LED as the light source is described in Patent Document 1.

PRIOR ART DOCUMENT

Patent Document

Patent Document 1: Japanese Unexamined Patent Publication 2007-317423

Problem to be Solved by the Invention

In the backlight unit with the above-mentioned configuration, the LED substrate arranged in the chassis together with the reflection sheet may be fixed to the chassis by means of a screw. At this time, when the LED substrate and the reflection sheet are fixed to multiple positions with the screws, following problems can occur.

That is, when thermal environment in the backlight unit changes, the LED substrate and the reflection sheet may expand or contract due to thermal expansion or thermal contraction. Here, when the LED substrate and the reflection sheet are strongly fixed to multiple positions with the screws, since expansion and contraction are restricted at the fixed places, local deformation such as warp and flexure is easy to be generated at unfixed places. When the reflection sheet has such deformation, irregularity in reflected light easily occurs, thereby exerting a negative effect on display quality. When the LED substrate has such deformation, a contact failure occurs at a connecting portion with an external circuit or the like, thereby possibly causing a deficiency in performing lighting control of the LED.

DISCLOSURE OF THE PRESENT INVENTION

The present invention was made in view of the forgoing circumstances, and the object is to reduce the tendency to generate local deformation in an extending member.

Means for Solving the Problem

A lighting device according to the present invention includes a light source, a chassis storing the light source therein, an extending member extending along an inner surface of the chassis, a holding member fixed to the chassis and to hold the extending member to the chassis such that the extending member is sandwiched between the holding member and the chassis, and a restricting part restricting positional relationship of the holding member with respect to the extending member such that a gap is provided between the holding member and the extending member.

With this configuration, when the holding member is fixed to the chassis, the extending member is held between the holding member and the chassis. Since the positional relationship of the holding member with respect to the extending member is restricted by the restricting part to create the gap between the holding member and the extending member, when thermal expansion or thermal contraction is caused by a change in the thermal environment, the extending member is easy to expand or contract. As a result, local deformation such as warp and flexure is hard to occur in the extending member.

BRIEF DESCRIPTION OF THE DRAWINGS

FIG. 1 is an exploded perspective view showing a schematic configuration of a television receiver according to a first embodiment of the present invention;

BEST MODE FOR CARRYING OUT THE INVENTION

First Embodiment

Figure 3:
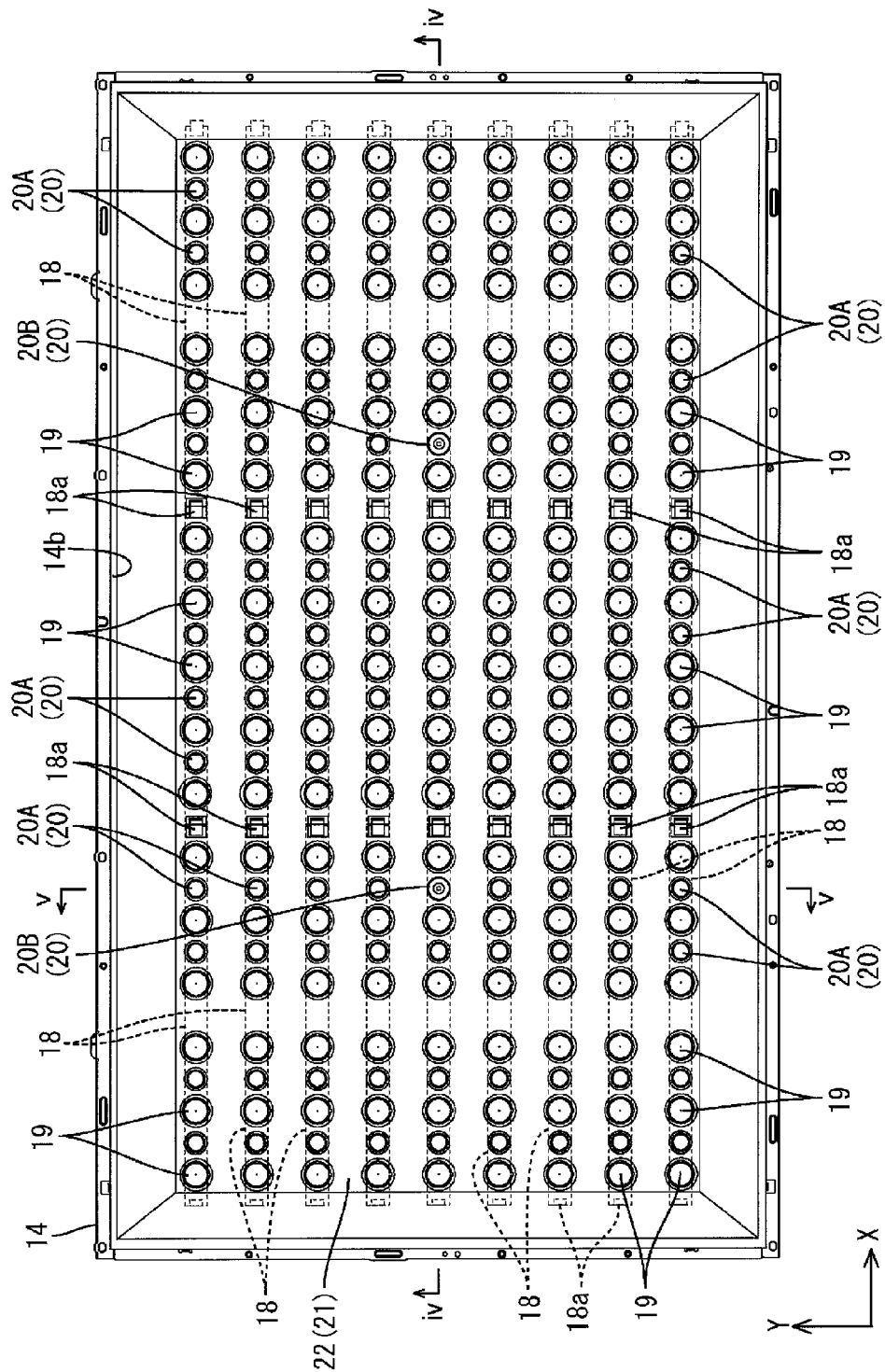
FIG. 3 is a plan view showing an arrangement configuration of LED substrates and holding members in a chassis provided in the liquid crystal display device.
Figure 4:
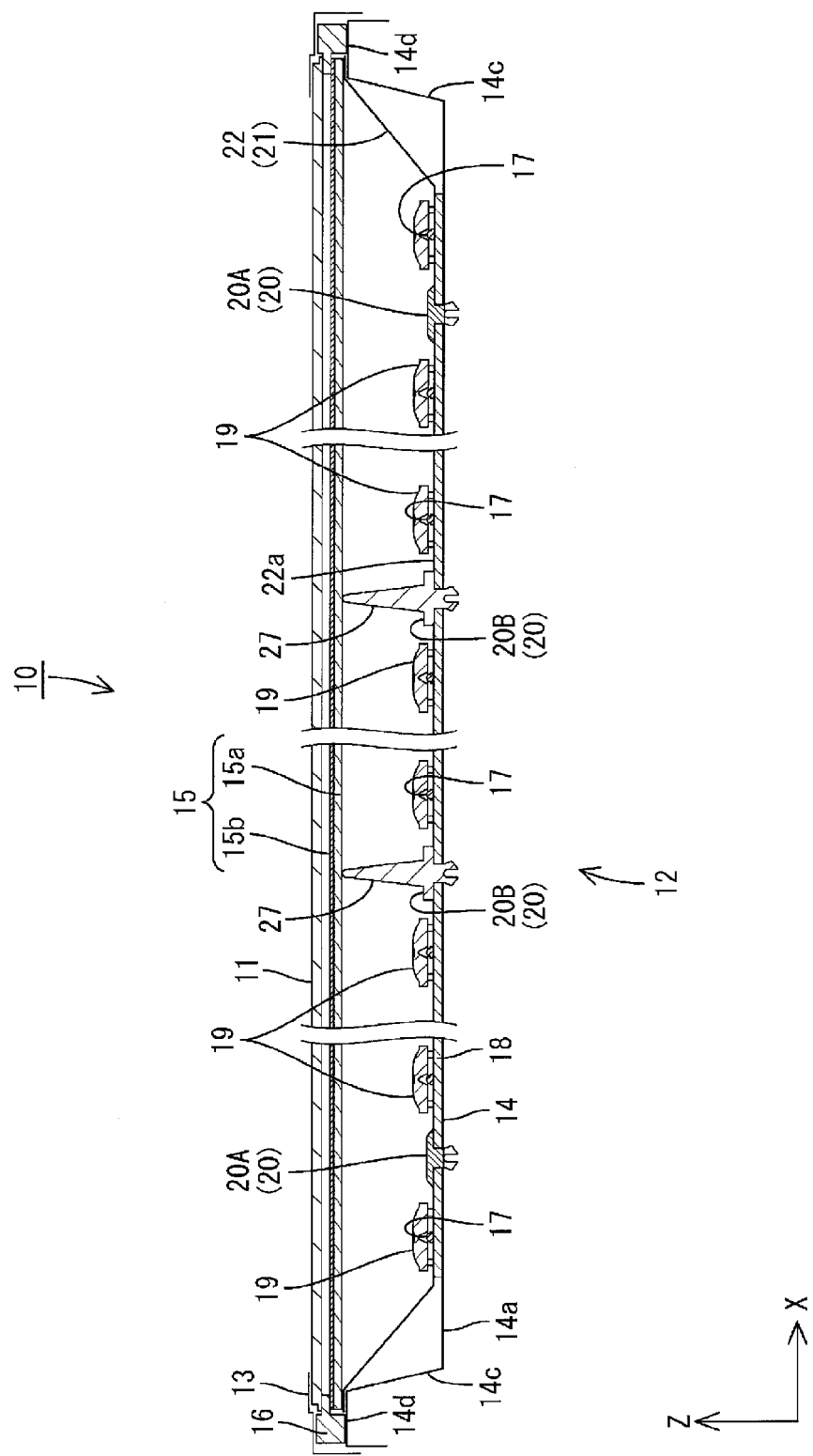
FIG. 4 is a sectional view taken along line iv-iv in FIG. 3 of the liquid crystal display device.
Figure 5:
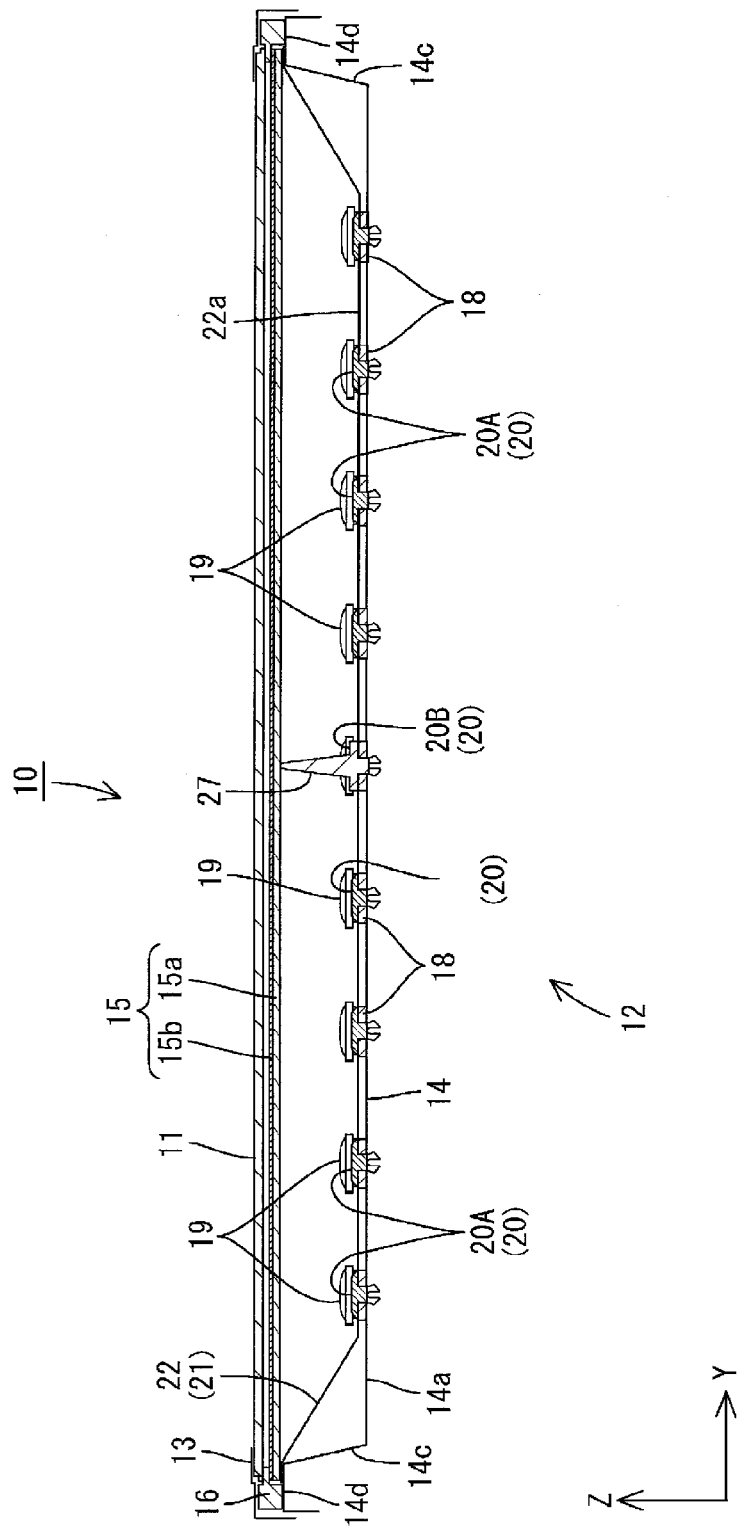
FIG. 5 is a sectional view taken along line v-v in FIG. 3 of the liquid crystal display device.

A first embodiment of the present invention will be described with reference to FIGS. 1 to 17. In this embodiment, a liquid crystal display device 10 is used as an example. Apart of each figure shows an X-axis, a Y-axis and Z-axis, and a direction of each axis is represented in each figure. It is given that an upper side in FIGS. 4 and 5 is a front side and a lower side in these figures is a back side.

Figure 2:
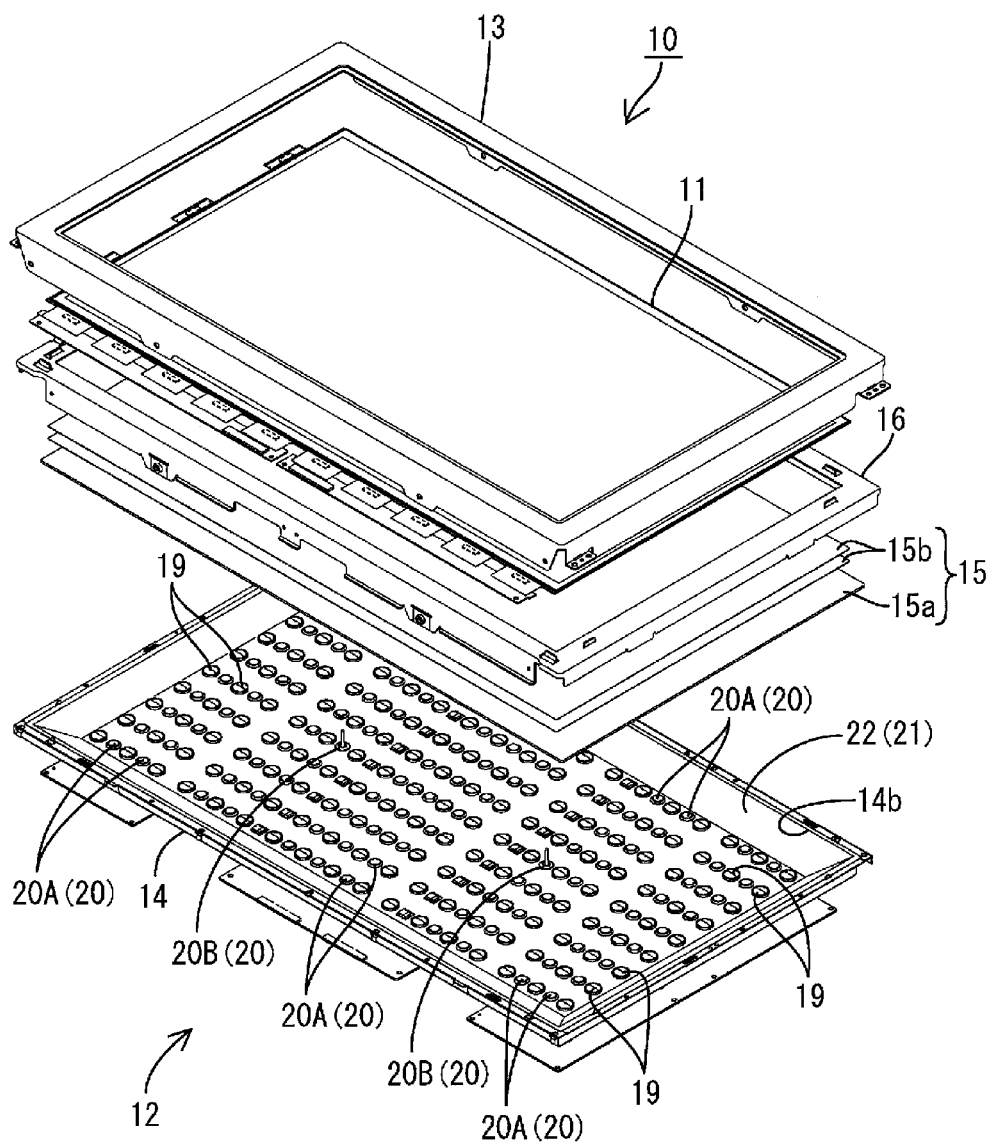
FIG. 2 is an exploded perspective view showing a schematic configuration of a liquid crystal display device provided in the television receiver.

A television receiver TV according to this embodiment includes, as shown in FIG. 1, the liquid crystal display device 10, front and back cabinets Ca, Cb that store the liquid crystal display device 10 therebetween, a power source P, a tuner T and a stand S. The liquid crystal display device (display device) 10 is shaped like an oblong quadrangle as a whole (rectangular) and is stored in a longitudinally mounted state. The liquid crystal display device 10 includes, as shown in FIG. 2, a liquid crystal panel 11 as a display panel and a backlight unit (lighting device) 12 as an external light source, and these constituents are integrally held by a frame-like bezel 13 or the like. In this embodiment, it is assumed that a screen size is 42 inches and an aspect ratio is 16:9.

Next, the liquid crystal panel 11 and the backlight unit 12 that constitute the liquid crystal display device 10 will be successively described. The liquid crystal panel (display panel) 11 among them is rectangular in a plan view, and is formed by sticking a pair of glass substrates to each other with a predetermined gap therebetween and filling a liquid crystal between both the glass substrates. One glass substrate is provided with a switching component (for example, TFT) connected to a source wiring and a gate wiring that are orthogonal to each other, a pixel electrode connected to the switching component and an alignment film, and the other glass substrate is provided with a color filter in which color sections of R (red), G (green), B (blue) are arranged in a predetermined pattern, a counter electrode and an alignment film and the like. Polarizing plates are provided outer of both the substrates.

Subsequently, the backlight unit 12 will be described in detail. The backlight unit 12 includes, as shown in FIG. 2, a substantially box-like chassis 14 having openings 14b on the side of a light emitting surface (the side of the liquid crystal panel 11), an optical member group 15 (a diffuser (light diffusing member) 15a, and a plurality of optical sheets 15b arranged between the diffuser 15a and the liquid crystal panel 11) arranged so as to cover the openings 14b of the chassis 14, and a frame 16 that is arranged along an outer edge of the chassis 14 and holds an outer edge of the optical member group 15 between the frame 16 and the chassis 14. In the chassis 14, as shown in FIGS. 3 to 5, LEDs 17 (Light Emitting Diode) as light sources, LED substrates 18 (extending member) that mount the LEDs 17 thereon and diffuser lenses 19a attached at positions corresponding to the LEDs 17 on the LED substrates 18 are provided. In the chassis 14, holding members 20 capable of holding the LED substrates 18 between the holding members 20 and the chassis 14, and a reflection sheet 21 (extending member) reflecting light in the chassis 14 toward the optical member 15 are provided. In the backlight unit 12, the side of the optical member 15, not the LEDs 17, is set as a light emitting side. Hereinafter, each constituent of the backlight unit 12 will be described in detail.

The chassis 14 is made of metal, and as shown in FIGS. 3 to 5, is constituted of a rectangular bottom plate 14a like the liquid crystal panel 11, side plates 14c rising from outer ends of sides of the bottom plate 14a and receiving plates 14d extending outward from rising ends of the respective side plates 14c, and is shaped like a shallow box (shallow dish) opened toward the front side 8 as a whole. In the chassis 14, its long-side direction corresponds to the X-axis direction (horizontal direction) and its short-side direction corresponds to the Y-axis direction (vertical direction). The frame 16 and the below-mentioned optical member 15 can be mounted on each of the receiving plates 14d of the chassis 14 from the front side. The frame 16 is secured to each of the receiving plates 14d with a screw. Attachment holes 14e for attaching the holding members 20 are provided in the bottom plate 14a of the chassis 14. The plurality of attachment holes 14e corresponding to attachment positions of the holding members 20 is distributed on the bottom plate 14a.

Figure 7:
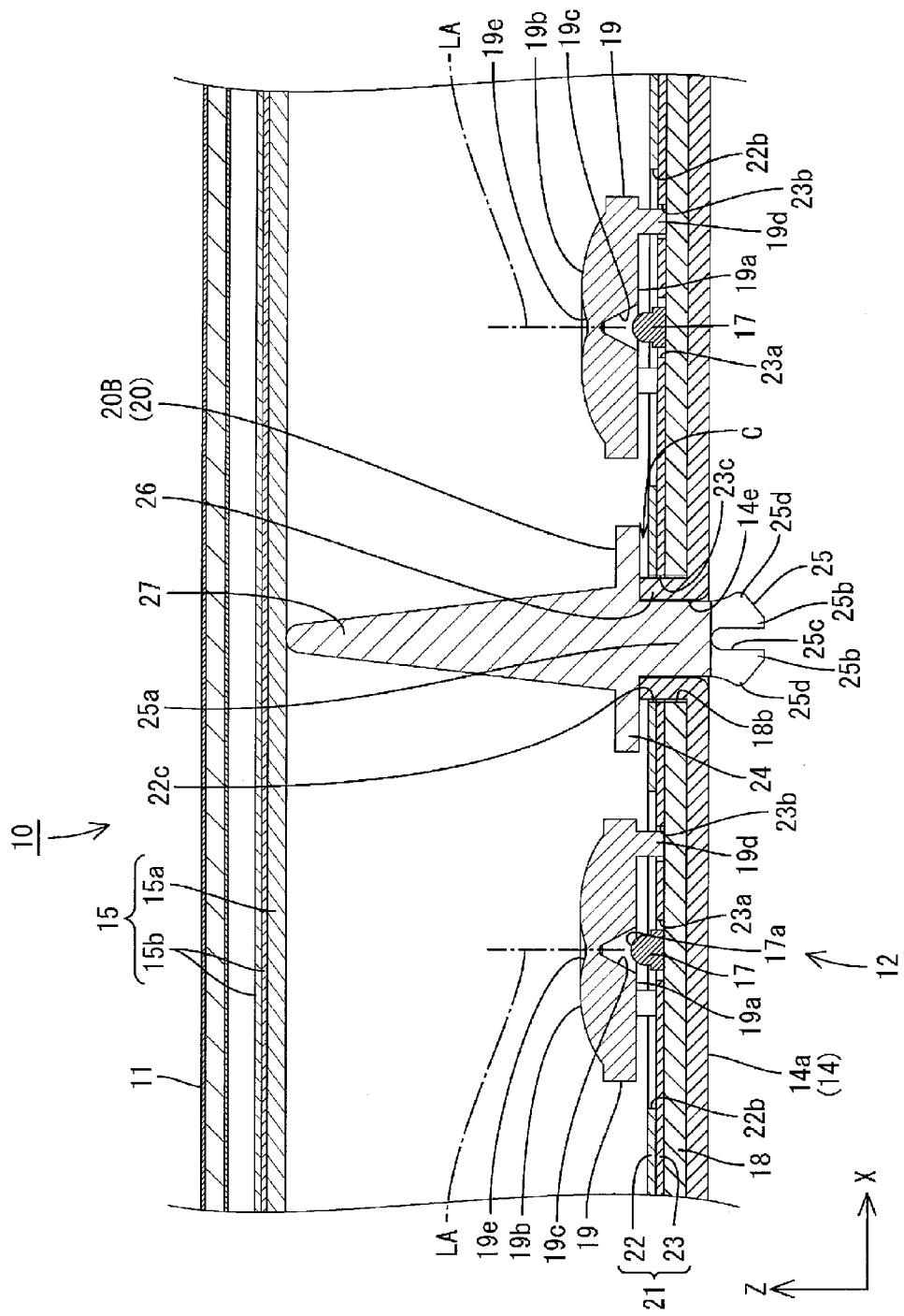
FIG. 7 is a sectional view taken along line vii-vii in FIG. 6.
Figure 8:
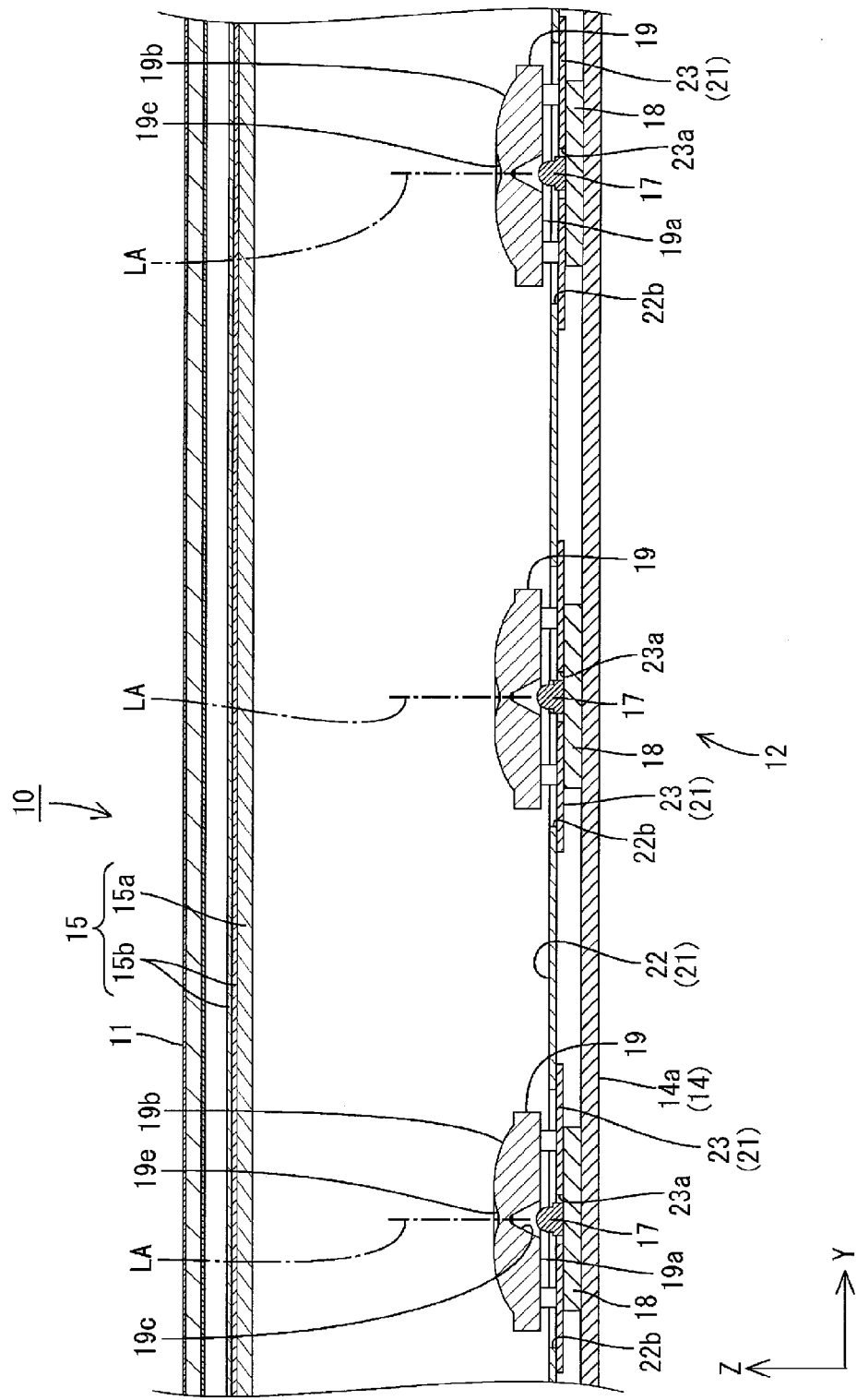
FIG. 8 is a sectional view taken along line viii-viii in FIG. 6.
Figure 9:
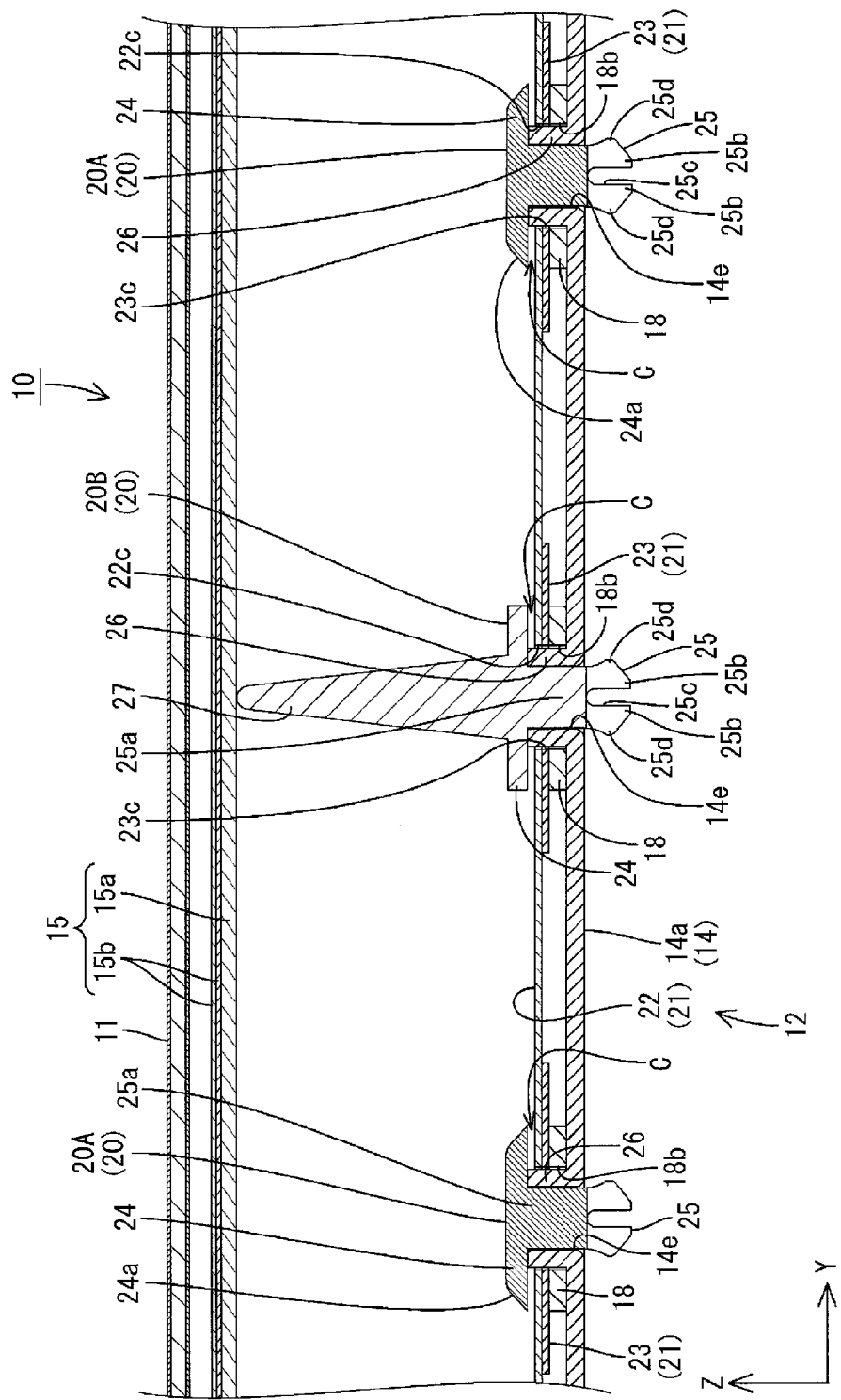
FIG. 9 is a sectional view taken along line ix-ix in FIG. 6.

As shown in FIG. 2, like the liquid crystal panel 11 and the chassis 14, the optical member 15 is shaped like an oblong quadrangle (rectangular) in a plan view. As shown in FIGS. 4 and 5, the optical member 15 covers the openings 14b of the chassis 14 by placing its outer edge on the receiving plates 14d, and is interposed between the liquid crystal panel 11 and the LEDs 17. The optical member 15 is constituted of the diffuser 15a arranged on the back side (the side of the LEDs 17, the side opposite to the light-emitting side) and the optical sheets 15b arranged on the front side (the side of the liquid crystal panel 11, the light-emitting side). The diffuser 15a is formed by dispersing multiple diffusing particles in a substantially transparent resin base member having a predetermined thickness and has a function of diffusing transmitted light. The optical sheet 15b is shaped like a thinner sheet than the diffuser 15a and two sheets are laminated (FIGS. 7 to 9). Specific examples of the optical sheets 15b includes diffuser sheets, lens sheets, reflection type polarizing sheets, and it is possible to select and use any of these sheets as appropriate.

As shown in FIG. 2, the frame 16 is shaped like a frame along outer circumferences of the liquid crystal panel 11 and the optical member 15. An outer edge of the optical member 15 can be pinched between the frame 16 and each of the receiving plates 14d (FIGS. 4 and 5). The frame 16 can receive the outer edge of the liquid crystal panel 11 from the back side and pinch the outer edge of the liquid crystal panel 11 between the frame 16 and the bezel 13 arranged on the front side (FIGS. 4 and 5).

Figure 10:
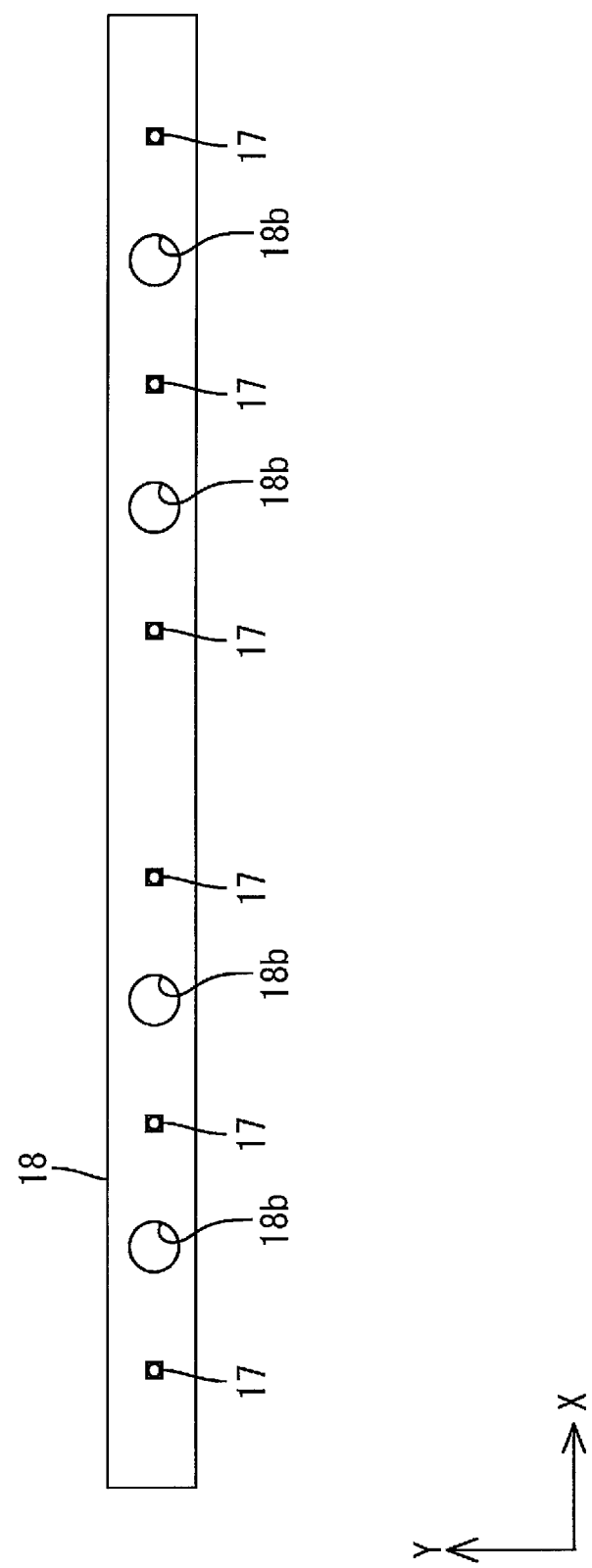
FIG. 10 is a plan view of the LED substrate.

Next, the LEDs 17 and the LED substrates 18 that mount the LEDs 17 thereon will be described in detail. As shown in FIG. 7, FIG. 8 and FIG. 10, each of the LED 17 is formed by sealing an LED chip on a substrate portion fixedly attached to the LED substrate 18 with a resin material. The LED chip mounted on the substrate portion has one type of main light-emitting wavelength, and specifically, emits only blue light. Meanwhile, phosphors converting blue light emitted by the LED chip into white light are dispersedly mixed in the resin material sealing the LED chip. Thereby, the LED 17 can emit white light. This LED 17 is a so-called top type in which a surface on the side opposite to the mounting surface of the LED substrate 18 acts as a light-emitting surface 17a. An optical axis LA in the LED 17 substantially corresponds to the Z-axis direction (the direction orthogonal to the liquid crystal panel 11 and a main plate surface of the optical member 15.) Light emitted from the LEDs 17 extends radially to some extent about the optical axis LA within a predetermined angular range in a three-dimensional way, and has a higher directivity than light from a cold cathode tube. That is, the light emission intensity of the LED 17 becomes remarkably high in a direction along the optical axis LA and rapidly lowers as inclination angle relative to the optical axis LA is larger.

Each of the LED substrates 18 has, as shown in FIG. 10, a base member shaped like a rectangle in a plan view, and is stored in the chassis 14 while extending along the bottom plate 14a in the state where its long-side direction corresponds to the X-axis direction and its short-side direction corresponds to the Y-axis direction (FIG. 3). The base member of the LED substrate 18 is made of metal such as aluminum material that is the same as the material for the chassis 14, and has a surface on which a wiring pattern formed of a metal film such as a copper foil is formed via an insulating layer. Insulating materials such as ceramic can be used as the material for the base member of the LED substrate 18. As shown in FIG. 7, FIG. 8 and FIG. 10, the LEDs 17 having the above-mentioned configuration are mounted on a surface facing the front side (surface facing the optical member 15 side) among surfaces of the base member of the LED substrate 18. The plurality of LEDs 17 is linearly arranged along the long-side direction of the LED substrates 18 (X-axis direction) in parallel, and are serially connected according to the wiring pattern formed on the LED substrates 18. The alignment pitch of the LEDs 17 is almost constant, that is, the LEDs 17 are arranged at regular intervals. A connector portion 18a is provided at both ends of each the LED substrates 18 in the long-side direction.

As shown in FIG. 3, the plurality of LED substrates 18 having the above-mentioned configuration is arranged in the chassis 14 in each of the X-axis direction and the Y-axis direction so that the LED substrates 18 are aligned in the long-side direction and the short-side direction in parallel. That is, the LED substrates 18 and the LEDs 17 mounted thereon are arranged in the chassis 14 in a matrix having the X-axis direction (the long-side direction of the chassis 14 and the LED substrate 18) as a row direction and the Y-axis direction (the short-side direction of the chassis 14 and the LED substrate 18) as the column direction. Specifically, the three LED substrates 18 in the X-axis direction x the nine LED substrates 18 in the Y-axis direction, that is, 27 LED substrates 18 in total are arranged in the chassis 14 in parallel. In this embodiment, two types of LED substrates 18 having different long-side dimensions and the number of mounted LEDs 17 are used. Specifically, a six-mounted type of the LED substrate 18 that mounts the six LEDs 17 thereon and has a relatively long long-side dimension and a five-mounted type of the LED substrate 18 that mounts the six LEDs 17 thereon and has a relatively short long-side dimension are used as the LED substrates 18, and the six-mounted type of the LED substrate 18 is arranged at each end of the chassis 14 in the X-axis direction and the five-mounted type of the LED substrate 18 is arranged at the center in the same direction. As described above, the LED substrates 18 aligned in one row in the X-axis direction are electrically connected to each other by fitting the adjacent connector portions 18a with each other, and the connector portions 18a located at both ends of the chassis 14 in the X-axis direction are each electrically connected to an external control circuit not shown. Thereby, the LEDs 17 arranged on the LED substrate 18 forming one row are serially connected to one another, so that lighting-on and off of the lot of LEDs 17 contained in the one row can be controlled together by one control circuit, which enables reduction in costs. Even the different types of LED substrates 18 having different long-side dimensions and the number of mounted LEDs 17 have the substantially identical short-side dimension and alignment pitch of the LEDs 17.

By preparing plural types of LED substrates 18 having different long-side dimensions and the number of mounted LEDs 17 and appropriately using the different types of LED substrates 18 in combination, following effects can be obtained. That is, plural types of liquid crystal display device 10 having different screen sizes can be manufactured by appropriately changing the appropriateness of use of each type of LED substrate 18 and the number of LED substrates 18 of each type according to each screen size, and as compared to the case where a dedicated LED substrate having the same long-side dimension as the long-side dimension of the chassis 14 is prepared for each screen size, the number of types of necessary LED substrates 18 can be greatly reduced, which enables reduction in costs. Specifically, by adding an eight-mounted type LED substrate that mounts eight LEDs 17 thereon to the above-mentioned two types of LED substrates 18 (the five-mounted type and the six-mounted type) and appropriately using the three types of LED substrates 18 in combination, each of the liquid crystal display devices 10 having the screen size of 26 inches, 32 inches, 37 inches, 40 inches, 42 inches, 46 inches, 52 inches and 65 inches can be easily manufactured.

Figure 11:
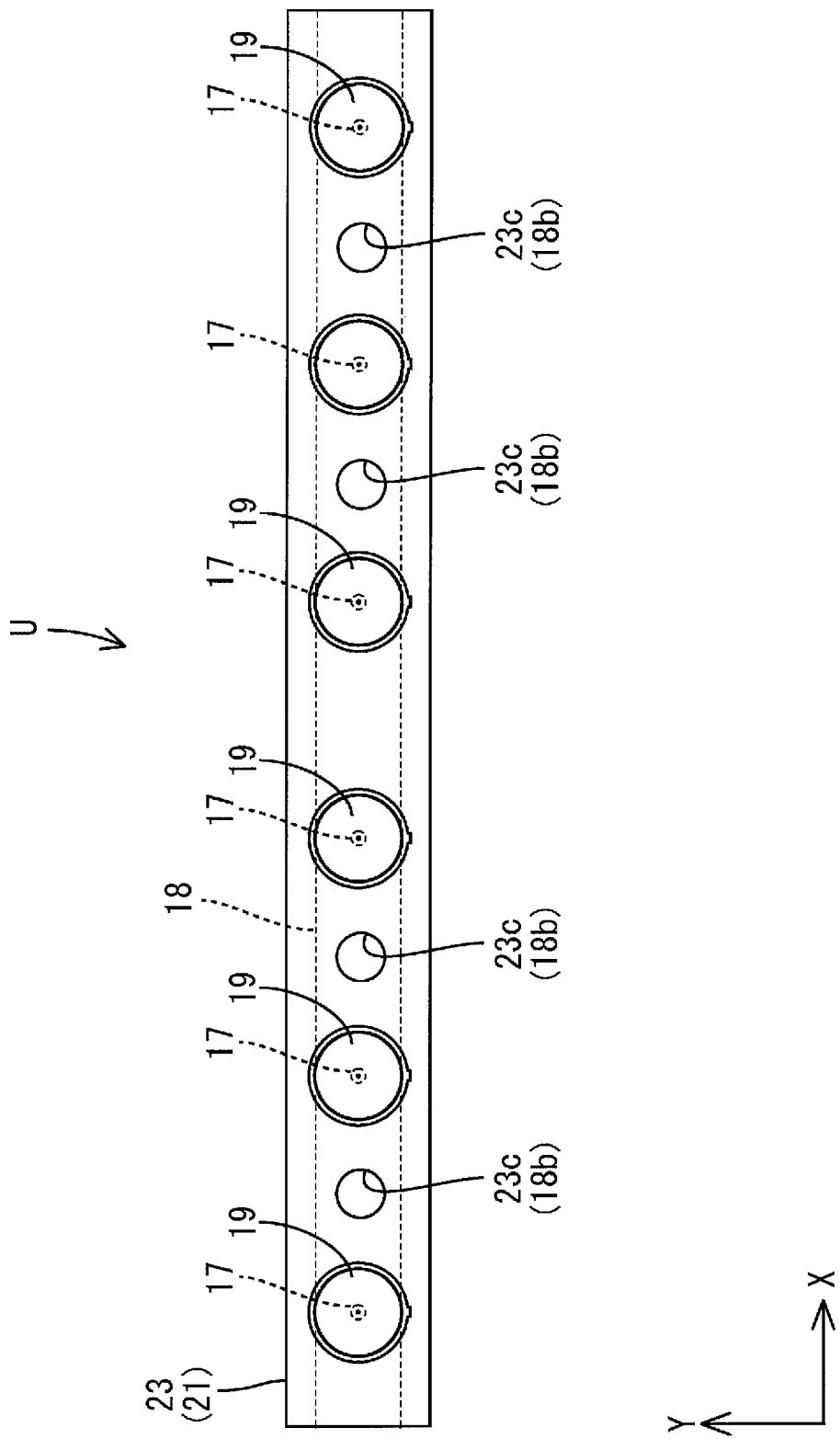
FIG. 11 is a plan view showing the state where a second reflection sheet and diffuser lenses are attached to the LED substrate (light source unit)
Figure 12:
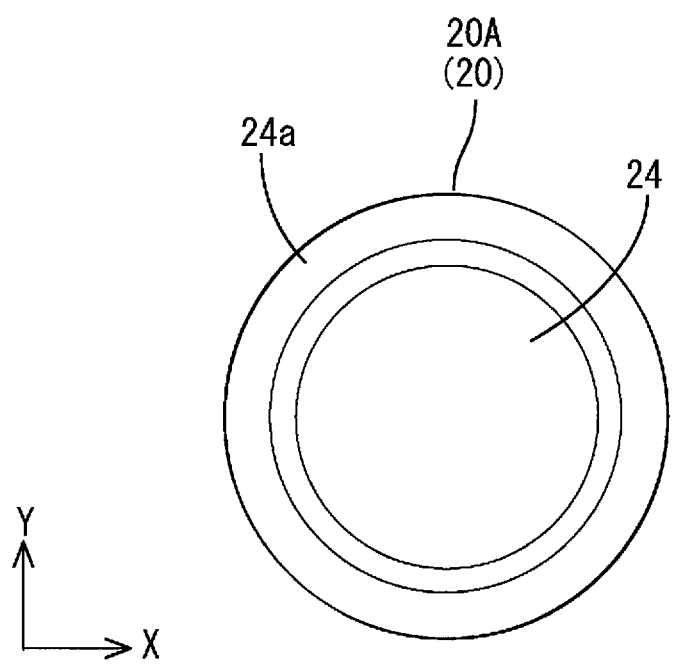
FIG. 12 is a plan view showing a single function-type holding member.

The diffuser lenses 19 are made of a synthetic resin material (e.g. polycarbonate and acrylic) that is substantially transparent (highly light transmissive) and has a higher refractive index than air. As shown in FIG. 7, FIG. 8 and FIG. 11, the diffuser lenses 19 each have a predetermined thickness, are formed to be substantially circular in a plan view, and are attached so as to cover the respective LEDs 17 from the front side of the LED substrate 18, that is, to overlap the respective LEDs 17 in a plan view. The diffuser lenses 19 can emit highly directive light from the LEDs 17 while diffusing the light. That is, since directivity of the light emitted from the LEDs 17 is reduced through the diffuser lenses 19, even when the interval of the adjacent LEDs 17 is set large, a region between the LEDs 17 is hard to be visually recognized as a dark place. Thereby, the number of installed LEDs 17 can be reduced. Each diffuser lens 19 is located to be substantially concentric with each LED 17 in a plan view. Each diffuser lens 19 has sufficiently larger dimensions in the X-axis direction and in the Y-axis direction than each LED 17. Although the diffuser lens 19 has a smaller dimension in the X-axis direction than the LED substrate 18, the diffuser lens 19 has a larger dimension Y-axis direction than the LED substrate 18. Accordingly, both ends of the diffuser lens 19 in the Y-axis direction each protrude outward by a predetermined dimension from the LED substrate 18 in the Y-axis direction.

In each of the diffuser lenses 19, a surface that faces the back side and is opposite to the LED substrate 18 is a light incidence surface 19a on which light from the LED 17 is incident, while a surface that faces the front side and is opposite to the optical member 15 is a light emitting surface 19b.

As shown in FIGS. 7 and 8, the light incidence surface 19a extends in parallel to a plate surface of the LED substrate 18 (the X-axis direction and the Y-axis direction) as a whole, but has an inclined surface obtained by forming a light incidence-side concave portion 19c in a region where the light incidence surface 19a and the LED 17 overlap each other in a plan view. The light incidence-side concave portion 19c is substantially conical, is located to be almost concentric with the diffuser lens 19 and is opened toward the back side, that is, the LED 17. The light incidence-side concave portion 19c has the largest diameter at its opened end facing the LED 17, which is larger than the diameter of the LED 17, and becomes smaller toward the front side in diameter continually and gradually, and finally becomes the smallest at its end of the front side. The light incidence-side concave portion 19c has a substantially inverted V-shaped cross section and a circumferential surface thereof is inclined relative to the Z-axis direction. The inclined surface is inclined so that the end of the front side crosses the optical axis LA of the LED 17. Accordingly, light emitted from the LED 17 and entering into the light incidence-side concave portion 19c is incident into the diffuser lens 19 through the inclined surface. At this time, the incident light is refracted away from the center, that is, with a wide angle, by an inclined angle of the inclined surface relative to the optical axis LA and is incident into the diffuser lens 19.

Attachment shaft portions 19d that protrude toward the LED substrate 18 and serve as attachment structure of the diffuser lens 19 to the LED substrate 18 are provided at positions outer of the light incidence-side concave portion 19c in the radial direction, on the light incidence surface 19a in the diffuser lens 19. The three attachment shaft portions 19d are located closer to an outer edge than the light incidence-side concave portion 19c in the diffuser lens 19, and a line connecting the attachment portions is substantially equilateral-triangular in a plan view. By fixing each of front ends of the attachment shaft portions 19d to the LED substrate 18 with an adhesive or the like, the diffuser lens 19 can be fixedly attached to the LED substrate 18. The diffuser lens 19 is fixed to the LED substrate 18 through the attachment shaft portions 19d so as to have a predetermined gap between the light incidence surface 19a and the LED substrate 18. This gap allows incidence of light from space outer of the diffuser lens 19 in a plan view. In the above-mentioned attachment state, a front end of the LED 17 protruding from the LED substrate 18 enters into the light incidence-side concave portion 19c.

The light emitting surface 19b in the diffuser lens is shaped like a substantially flat spherical surface. Thereby, the diffuser lens 19 can emit light while refracting the light on an interface with an external air layer in a direction away from the center, that is, with a wide angle. A light-emitting side concave portion 19e is formed in a region where the light emitting surface 19b overlaps the LED 17 in a plan view. The light-emitting side concave portion 19e is substantially bowl-like and is shaped like a substantially flat sphere having a circumferential surface inclined downward toward the center. An angle that a tangent line to the circumferential surface of the light-emitting side concave portion 19e forms with the optical axis LA of the LED 17 is set to be larger than an angle that the inclined surface of the light incidence-side concave portion 19c forms with the optical axis LA. The region where the light emitting surface 19b overlaps the LED 17 in a plan view receives extremely larger light amount from the LED 17 than the other region and therefore, its brightness tends to locally become high. However, by forming the light-emitting side concave portion 19e in the region, it becomes possible to emit most of light from the LED 17 while refracting the light with a wide angle, or reflect a part of the light from the LED 17 toward the LED substrate 18. Thereby, it is possible to prevent the brightness of the region where the light emitting surface 19b overlaps the LED 17 from locally becoming high, which is suitable for prevention of uneven brightness.

Next, the reflection sheet 21 will be described. The reflection sheet 21 is constituted of a first reflection sheet 22 that covers the substantially entire range of the inner surface of the chassis 14 and a second reflection sheet 23 that covers each of the LED substrates 18. Both the reflection sheets 22, 23 each are made of synthetic resin and have a white surface with excellent light reflectance. Both the reflection sheets 22, 23 extend along the bottom plate 14a (the LED substrate 18) in the chassis 14.

Figure 6:
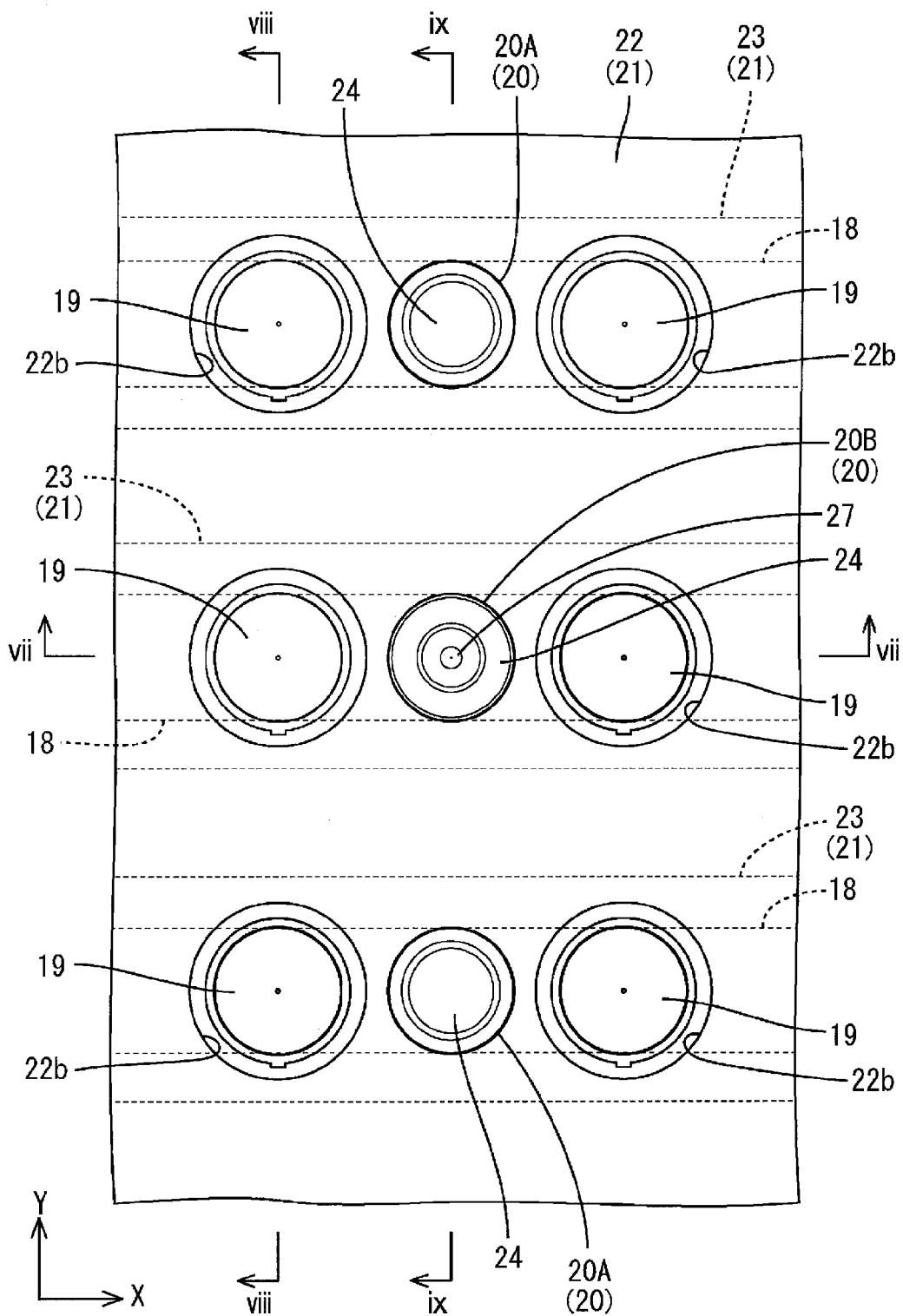
FIG. 6 is a plan view showing a detailed arrangement configuration of the LED substrates and the holding members.

First, the first reflection sheet 22 will be described. As shown in FIG. 3, most of the first reflection sheet 22 on the center side, which extends along the bottom plate 14a of the chassis 14, is a body portion 22a. A lens insertion hole 22b that can insert each LED 17 arranged in the chassis 14 as well as each diffuser lens 19 covering the LED 17 thereinto is formed through the body portion 22a. The plurality of lens insertion holes 22b is arranged in parallel at positions where the holes 22b overlap the LEDs 17 and diffuser lenses 19 on the body portion 22a in a plan view in a matrix. As shown in FIG. 6, each lens insertion hole 22b is circular in a plan view and has a larger diameter than the diffuser lens 19. Thereby, when the first reflection sheet 22 is installed in the chassis 14, the diffuser lenses 19 can be inserted into the respective lens insertion holes 22b irrespective of presence or absence of dimension error. Since the first reflection sheet 22 covers regions between adjacent diffuser lenses 19 and regions on the outer circumferential side in the chassis 14 as shown in FIG. 3, light toward each of the regions can be reflected toward the optical member 15. Further, as shown in FIGS. 4 and 5, outer circumferential portions of the first reflection sheet 22 rise so as to cover the side plates 14c and the receiving plates 14d of the chassis 14, and portions placed on the receiving plates 14d are sandwiched between the chassis 14 and the optical member 15. A portion connecting the body portion 22a of the first reflection sheet 22 to each of the portions placed on the receiving plates 14d is inclined.

Meanwhile, the second reflection sheet 23 has, as shown in FIG. 11, the almost same appearance as the LED substrate 18, that is, is rectangular in a plan view. As shown in FIGS. 7 and 8, the second reflection sheet 23 is arranged so as to overlap the front side surface of the LED substrate 18, and is opposite to the diffuser lens 19. That is, the second reflection sheet 23 is interposed between the diffuser lens 19 and the LED substrate 18. Accordingly, light returned from the diffuser lens 19 to the LED substrate 18 and light entering from space outer of the diffuser lens 19 in a plan view into space between the diffuser lens 19 and the LED substrate 18 can be reflected toward the diffuser lens 19 by the second reflection sheet 23 again. As a result, light utilization efficiency can be enhanced, thereby increasing brightness. In other words, even when the number of installed LEDs 17 is reduced to cut costs, sufficient brightness can be obtained.

As shown in FIG. 11, the second reflection sheet 23 has the almost same long-side dimension as the LED substrate 18 and has a larger short-side dimension than the LED substrate 18. Further, as shown in FIGS. 6 and 8, the short-side dimension of the second reflection sheet 23 is set to be larger than the diameter of the diffuser lens 19 and the lens insertion hole 22b of the first reflection sheet 22. Accordingly, the edge of the lens insertion hole 22b of the first reflection sheet 22 can be placed on the second reflection sheet 23 on the front side. Thereby, the first reflection sheet 22 and the second reflection sheet 23 are continuously arranged in the chassis 14 without any gap in a plan view, so that the chassis 14 or the LED substrate 18 is hardly exposed from the lens insertion hole 22b toward the front side. Therefore, light in the chassis 14 can be efficiently reflected toward the optical member 15, which is extremely preferable for improvement of brightness. LED insertion holes 23a that insert the respective LEDs 17 therethrough and shaft portion insertion holes 23b that insert the respective attachment shaft portions 19d of the diffuser lens 19 therethrough are formed in the second reflection sheet 23 at overlapping positions in a plan view.

Subsequently, the holding member 20 will be described. The holding member 20 includes two types: a complex function-type holding member 20B having both a holding function of holding the LED substrate 18 (the reflection sheets 22, 23) and a supporting function of supporting the optical member 15, and a single function-type holding member 20A having the holding function and no supporting function. Hereinafter, when the holding member 20 is discriminated, a subscript A is added to the single function-type and a subscript B is added to the complex function-type. When the holding member 20 is collectively called without being discriminated, no subscript is added to the reference numeral.

First, arrangement of the holding member 20 in the chassis 14 will be described. As shown in FIG. 3, multiple holding members 20 are arranged on the bottom plate 14a of the chassis 14. Describing in detail, given that the X-axis direction (the long-side direction of the chassis 14 and the LED substrate 18) is the row direction and the Y-axis direction (the short-side direction of the chassis 14 and the LED substrate 18) in the bottom plate 14a, the holding members 20 are arranged in the row and column directions (arranged in a matrix). Each of the holding members 20 is located at a position where the holding member overlaps each ED substrate 18 in a plan view and between adjacent diffuser lenses 19 (LEDs 17). Accordingly, the holding members 20 are arranged like the above-mentioned diffuser lenses 19 and the LEDs 17. Since one holding member 20 is arranged in a region between the adjacent diffuser lenses (LEDs 17) on the LED substrate 18, the diffuser lenses 19 (LEDs 17) and the holding members 20 are alternately arranged in the substantially X-axis direction. Specifically, the four holding members 20 are attached to each LED substrate 18. On the six-mounted type of LED substrate 18, the holding members 20 are arranged at positions other than the central position in the long-side direction in the regions between the adjacent diffuser lenses 19 (LEDs 17), and in the five-mounted type of LED substrate 18, the holding members 20 are arranged in all of the regions between the adjacent diffuser lenses 19 (LEDs 17).

As shown in FIG. 3, the a lot of holding members 20 arranged as described above are the single function-type holding members 20A except for later-described two complex function-type holding member 20B. The two complex function-type holding member 20B each are arranged at a position that is central in the short-side direction and closer to the center than an outer end in the long-side direction in the chassis 14. Describing the arrangement in the long-side direction in detail, the complex function-type holding members 20B are arranged symmetrically about the central LED substrate 18 among the three LED substrates 18 aligned in parallel in the X-axis direction.

Subsequently, specific configuration of the holding member 20 will be described. Although two types of holding members 20 exist as described above, the holding members 20 have mainly a common structure and the common structure will be described first. The holding member 20 is made of synthetic resin such as polycarbonate, and has a white surface with excellent light reflectance. The holding member 20 is substantially circular in a plan view as a whole. As shown in FIGS. 7 and 9, the holding member 20 includes a body portion 24 along the bottom plate 14a of the chassis 14 and the plate surface of the LED substrate 18, and a fixed portion 25 that protrudes from the body portion 24 toward the back side, that is, the chassis 14 and is fixed to the chassis 14. The holding member 20 is shaped symmetrically about a central axis in the Z-axis direction as a whole.

As shown in FIGS. 12 to 15, the body portion 24 is substantially circular in a plan view, and is shaped like an almost straight plate extending in the X-axis direction and the Y-axis direction. As shown in FIG. 6, the body portion 24 has the almost same diameter as the short-side dimension (dimension in the Y-axis direction) of the LED substrate 18. The body portion 24 is attached to the LED substrate 18 so as to overlap the LED substrate 18 in a plan view, thereby holding the LED substrate 18 between the body portion and the bottom plate 14a of the chassis 14. Since the body portion 24 is attached in the state where the reflection sheets 22, 23 are arranged beforehand on the front side of the LED substrate 18, the reflection sheets 22, 23 together with the LED substrate 18 can be sandwiched (FIGS. 7 and 9). That is, the holding member 20 according to this embodiment can pinch (hold) the reflection sheets 22, 23 and the LED substrate 18 as the extending members, which are laminated to one another, between the holding member and the chassis 14.

Describing in detail, as shown in FIG. 6, the body portion 24 is arranged so that its center corresponds to the center of the LED substrate 18 in the short-side direction. Accordingly, the body portion 24 can pinch the LED substrate 18 between the body portion and the chassis 14 over the entire length in the short-side direction. At this time, both outer ends of the body portion 24 in the Y-axis direction substantially coincide with both outer ends of the LED substrate 18 in the short-side direction. That is, the body portion 24 overlaps the LED substrate 18 almost entirely in a plan view, thereby being prevented from extending outside of the LED substrate 18. The diameter of the body portion 24 is set to be smaller than the interval (alignment pitch) between the adjacent diffuser lenses 19 (LEDs 17) in the X-axis direction. Thereby, the body portion 24 is arranged in a region between the adjacent diffuser lenses 19 (LEDs 17) on the LED substrate 18 in the X-axis direction, that is, in a non-luminous portion of the LED substrate 18 and thus, does not overlap the LED 17 in a plan view. That is, it is possible to prevent the body portion 24 from disturbing light emission from the LED 17. In this embodiment, since the interval between the LEDs 17 is made sufficiently large by using the diffuser lens 19 as described above, the holding member 20 is arranged in the space to fix the LED substrate 18.

Figure 13:
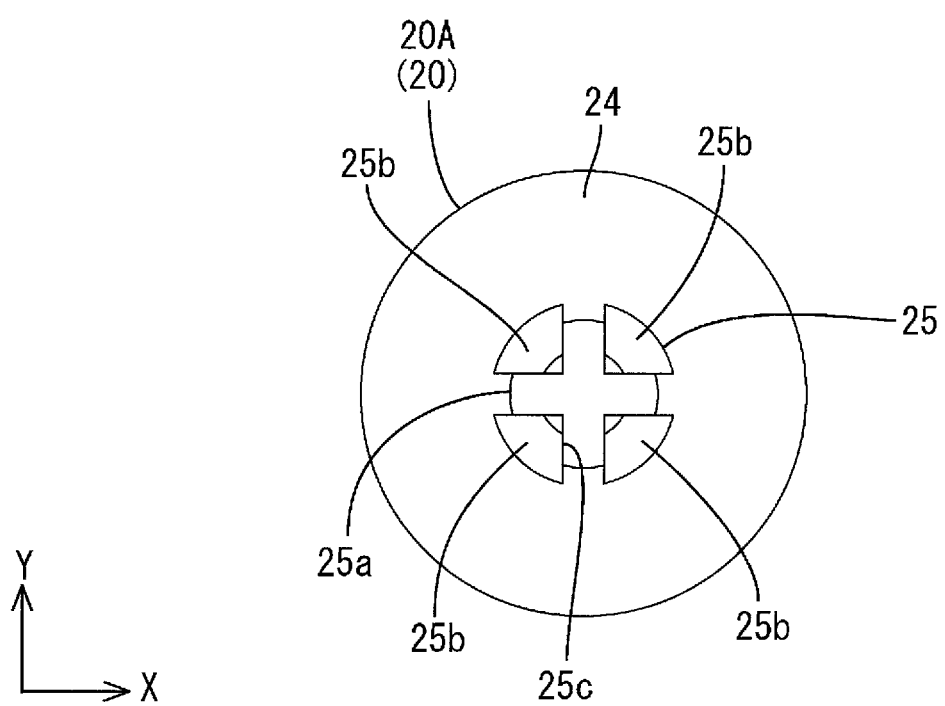
FIG. 13 is a bottom view showing the single function-type holding member.
Figure 15:
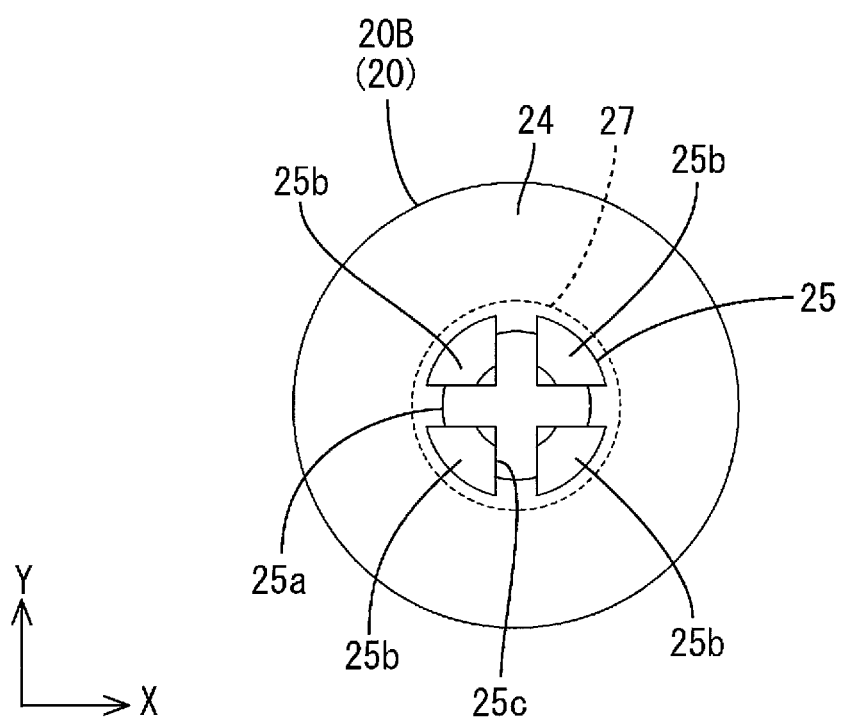
FIG. 15 is a bottom view showing the complex function-type holding member.

As shown in FIG. 9, the fixed portion 25 can be engaged with the bottom plate 14a of the chassis 14 through the attachment holes 14e formed at the attachment position of the holding member 20 on the bottom plate 14a. Hereinafter, detailed configuration of the fixed portion 25 will be described. As shown in FIGS. 13 and 15, the fixed portion 25 is arranged on the center side of the body portion 24. Describing in detail, the fixed portion 25 is arranged to be concentric with the body portion 24. The fixed portion 25 protrudes, as shown in FIG. 9, from the back side surface of the body portion 24 (surface opposite to the chassis 14) toward the back side, and a grooved portion 25c is formed at a front end of the fixed portion 25 to form elastic engaged portions 25b. In other words, the fixed portion 25 is constituted of a bottom portion 25a protruding from the body portion 24 toward the back side, and the elastic engaged portions 25b protruding a protruding front end of the bottom portion 25a further toward the back side. The bottom portion 25a is substantially cylindrical and has a diameter that is smaller than that of the attachment holes 14e of the chassis 14 so as to allow insertion into the attachment holes 14e.

As shown in FIGS. 13 and 15, the elastic engaged portions 25b are four portions divided by the substantially crosswise grooved portion 25c in a plan view. Each of the elastic engaged portions 25b cantilevers as shown in FIGS. 7 and 9, and can be elastically deformed using a protruding bottom end part of the bottom portion 25a as a fulcrum while forming a hollow into the grooved portion 25c. That is, the grooved portion 25c serves as flexure space for the elastic engaged portions 25b. Engaging portion 25d swelling outward, that is, to the side opposite to the grooved portion 25c, are provided on outer side surfaces of the elastic engaged portions 25b. Each of the engaging portions 25d protrudes outward further than the outer circumferential surface of the bottom portion 25a, and the diameter of the fixed portion 25 at the swelled ends (the largest diameter) is larger than the diameter of the attachment hole 14e. In other words, the swelled ends of the engaging portion 25d are located outer of the inner circumferential surface of the attachment holes 14e. Accordingly, the engaging portions 25d can be engaged with the edge of the attachment hole 14e of the chassis 14, that is, the part adjacent to the fixed portion 25 in the chassis 14, from the back side. When the fixed portion 25 is inserted into the attachment hole 14e of the chassis 14 in this manner, each elastic engaged portion 25b passes through the attachment hole 14e and is elastically engaged with the edge of the attachment hole 14e from the back side. In this manner, the holding member 20 can be fixedly attached to the chassis 14. The plurality of attachment holes 14e is arranged in parallel at the attachment positions of the holding members 20 on the bottom plate 14a of the chassis 14 in the X-axis direction and the Y-axis direction in a matrix.

As shown in FIG. 6, the body portion 24 provided with the fixed portion 25 entirely overlaps the LED substrate 18 in a plan view. Accordingly, since the fixed portion 25 also overlaps the LED substrate 18 in a plan view, a through hole 18b that passes the fixed portion 25 therethrough is formed in the LED substrate 18. As shown in FIG. 10, the through hole 18b is located between the adjacent LEDs 17 (diffuser lenses 19) on the LED substrate 18, that is, at the non-overlapping position with the LED 17 (diffuser lens 19) in a plan view. As shown in FIG. 7, FIG. 9 and FIG. 11, through holes 22c, 23c that communicate with the through holes 18b of the LED substrate 18 and can pass the fixed portion 25 therethrough are formed so as to overlap the through holes 18b of the LED substrate 18 in a plan view on the reflection sheets 22, 23 sandwiched between the body portion 24 and the LED substrate 18, respectively.

In the chassis 14 according to this embodiment, as shown in FIGS. 7 and 9, there is provided a restricting part 26 for restricting positional relationship of the holding member 20 with respect to the reflection sheets 22, 23 and the LED substrate 18 as the extending members, which are sandwiched between the restricting part 26 and the holding member 20, in the Z-axis direction (direction orthogonal to the chassis 14 and the plate surface of the first reflection sheet 22). The restricting part 26 is provided integrally with the bottom plate 14a of the chassis 14, and protrudes from the bottom plate 14a toward the front side (the holding member 20). A protruding end surface of the restricting part 26 is in direct contact with the back side surface of the body portion 24 (the surface facing the first reflection sheet 22) in the holding member 20, resulting in that the back side surface of the body portion 24 floats from the first reflection sheet 22 located closest to the holding member 20 (opposite to the holding member 20) among the extending members and is kept in a non-contact state, and has a gap C between the body portion 24 and the first reflection sheet 22. Protruding dimension of the restricting part 26 from the bottom plate 14a is set to be larger than the sum of thicknesses of the LED substrate 18 and the reflection sheets 22, 23, and the gap C having size corresponding to a difference in dimension. As described above, the holding member 20 does not directly press the reflection sheets 22, 23 and the LED substrate 18 from the front side and thus, hardly exerts a pressing force (stress) on the reflection sheets 22, 23 and the LED substrate 18.

Figure 17:
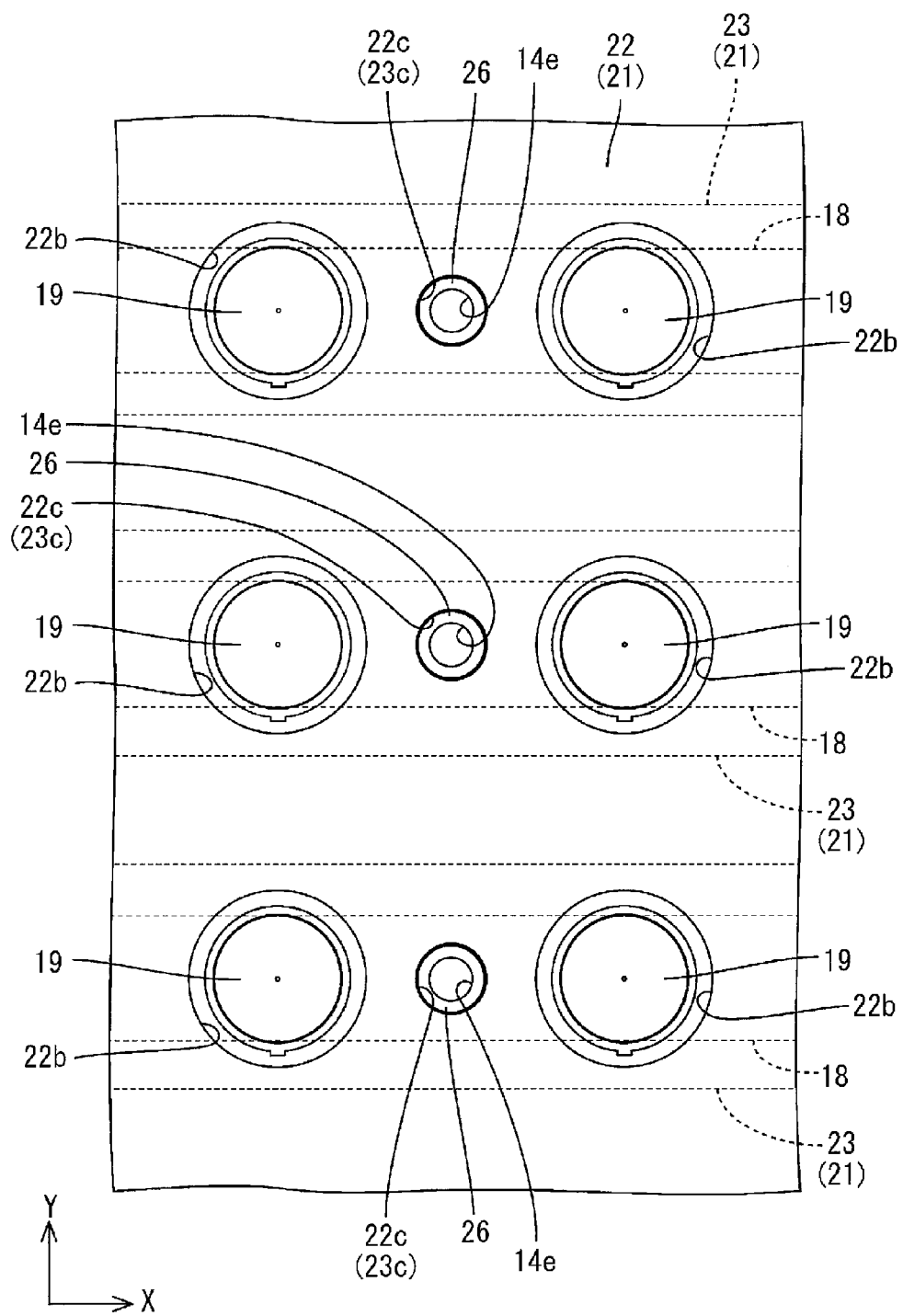
FIG. 17 is a plan view showing the state where the light source unit and a first reflection sheet are attached to the chassis.

Describing in detail, the bottom plate 14a is subjected to drawing so as to partially protrude toward the front side to form the restricting part 26, and a protruding bottom end is connected to the edge of the attachment hole 14e on the bottom plate 14a. That is, the restricting part 26 is located so as to overlap the edge of the attachment hole 14e (the engaging portion 25d of the elastic engaged portion 25b) in a plan view and to be adjacent to the fixed portion 25 inserted into the attachment hole 14e. The restricting part 26 surrounds the entire circumference of the attachment hole 14e and is shaped like an endless circle along the edge of the attachment hole 14e in a plan view (FIG. 17). The restricting part 26 is shaped like a substantially short cylinder rising from the edge of the attachment hole 14e toward the front side, and has the almost same inner diameter as that of the attachment hole 14e. That is, an inner circumferential surface of the restricting part 26 and an inner circumferential surface of the attachment hole 14e are flush with each other and constitute a continuous plane without any difference in level. The fixed portion 25 can be inserted into the restricting part 26 from the front side. Since the restricting part 26 rises from the edge of the attachment hole 14e toward the front side and an opening of the protruding front end constitutes an inlet to the attachment holes 14e, the restricting part 26 also functions as a guide for inserting the fixed portion 25 into the attachment hole 14e.

The restricting part 26 arranged on the edge of the attachment hole 14e is in contact with the back side surface of the body portion 24, while the engaging portions 25d of the fixed portion 25 are engaged with the edge of the attachment hole 14e from the back side, so that the edge of the attachment hole 14e and the restricting part 26 are sandwiched between the body portion 24 and the engaging portions 25d. The protruding end surface of the restricting part 26 is in contact with apart that is adjacent to the fixed portion 25 in a plan view and surrounds the fixed portion 25, in the back side surface of the body portion 24. Here, a neighboring part of the fixed portion 25 as a fixed place of the body portion 24 to the chassis 14 may be subjected to stress with fixation, and the stress causes the body portion 24 to get close to the first reflection sheet 22. However, in this embodiment, since the restricting part 26 is in contact with the part of the holding member 20, which is adjacent to the fixed portion 25, that is, the part on which the stress may act directly, it is prevented that the body portion 24 gets close to the first reflection sheet 22 due to the stress. Thereby, the gap C between the first reflection sheet 22 and the body portion 24 can be ensured.

The outer diameter of the restricting part 26 is set to be larger than the largest outer diameter of the fixed portion 25. Meanwhile, each of the through holes 18b, 22c, 23c formed in the LED substrate 18 and the reflection sheets 22, respectively, has such a dimension that can pass the restricting part 26 therethrough. Describing in detail, each of the through holes 18b, 22c, 23c is substantially circular in a plan view so as to conform the outer shape of the restricting part 26, and has the diameter that is slightly larger than the outer diameter of the restricting part 26 so as to allow insertion of the restricting part 26. Accordingly, the restricting part 26 as well as the fixed portion 25 can be passed through each of the through holes 18b, 22c, 23c. When the restricting part 26 is inserted into each of the through holes 18b, 22c, 23c, the outer circumferential surface can contact the inner circumferential surface (edge) of the through hole, resulting in that the reflection sheets 22, 23 and the LED substrate 18 can be positioned with respect to the chassis 14 in the X-axis direction and the Y-axis direction in a two-dimensional way. The outer diameter of the restricting part 26 has such a dimension as a sum of the diameter of the attachment holes 14e and the thickness of the restricting part 26. A contact region of the restricting part 26 with the body portion 24 has a ring shape having a width corresponding to the difference between the diameter of the attachment holes 14e and the diameter of each of the through holes 18b, 22c, 23c.

Next, difference between the two types of holding members 20 in configuration will be described. As shown in FIG. 9, an inclined surface 24a is formed on an outer circumferential end surface of the body portion 24 in the single function-type holding member 20A. The inclined surface 24a is inclined downward from the center toward the outer end of the body portion 24, thereby eliminating or reducing possible step from the first reflection sheet 22. As a result, the outer circumference (boundary with the reflection sheet 21) of the body portion 24 is hard to be visually recognized as unevenness brightness through the optical member 15. Although not shown, the inclined surface 24a may be provided at the complex function-type holding member 20B.

As shown in FIGS. 7 and 9, the complex function-type holding member 20B includes a supporting portion 27 that protrudes the body portion 24 toward the front side and can support the optical member 15 from the back side. The supporting portion 27 is conical as a whole. Describing in detail, the supporting portion 27 has a circular cross section cut along the plate surface of the body portion 24 and is tapered so that its diameter becomes smaller from a protruding bottom end toward a protruding front end. The supporting portion 27 can contact the diffuser 15a located closest to the back side (LED 17 side) in the optical member 15, thereby supporting the diffuser 15a at a predetermined position. That is, the supporting portion 27 can restrict positional relationship between the optical member 15 and the LED 17 in the Z-axis direction (the direction orthogonal to the surface of the optical member 15) to be constant.

The outer diameter of a protruding bottom end of the supporting portion 27 is set to be smaller than both the short-side dimension of the body portion 24 and the short-side dimension of the LED substrate 18. That is, the supporting portion 27 is point in a plan view, while the body portion 24 is sheet-like in a plan view over a wider scope than the supporting portion 27. The protruding dimension of the supporting portion 27 is almost equal to the distance between the front side surface of the body portion 24 and the back side surface of the diffuser 15a, which is almost straight in the X-axis direction and the Y-axis direction. Accordingly, the supporting portion 27 is in contact with the almost straight diffuser 15a. The protruding front end of the supporting portion 27 as the contact place with the diffuser 15a is rounded. Since the supporting portion 27 is an only portion in the complex function-type holding member 20B, which protrudes from the body portion 24 toward the front side, in attaching the complex function-type holding member 20B to the chassis 14, the operator can use the supporting portion 27 as an operating portion. Thereby, attachment workability of the complex function-type holding member 20B can be improved.

Figure 14:
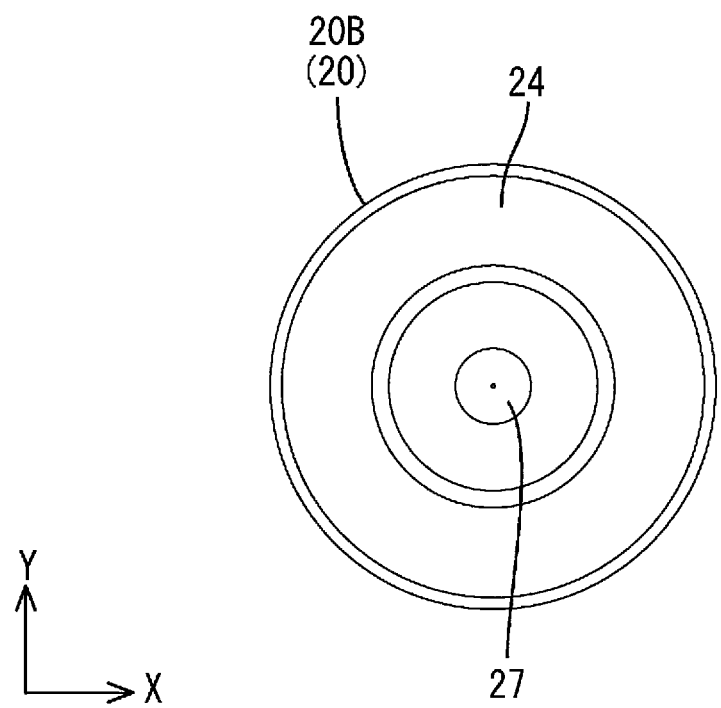
FIG. 14 is a plan view showing a complex function-type holding member.

As shown in FIGS. 14 and 15, the supporting portion 27 is located substantially at the center of the body portion 24. That is, the supporting portion 27 is located at such a position as to overlap the fixed portion 25 arranged on the back side in a plan view. Describing in more detail, the supporting portion 27 and the fixed portion 25 are located so as to be concentric with each other in a plan view. With such arrangement, in attaching the complex function-type holding member 20B to the chassis 14, when the operator uses the supporting portion 27 as the operating portion, the operator can easily know the position of the fixed portion 25 hidden on the back side by visually recognizing the supporting portion 27 exposed on the front side. Accordingly, workability in inserting the fixed portion 25 into the attachment hole 14e can be improved.

This embodiment has the above-mentioned configuration, and its action will be described. The liquid crystal display device 10 shown in FIGS. 4 and 5 is manufactured by separately manufacturing the liquid crystal panel 11 and the backlight unit 12 and assembling them by use of the bezel 13 or the like. Especially, the assembling operation in manufacturing the backlight unit 12 will be described in detail.

In this embodiment, prior to assembling of each constituent to the chassis 14, LEDs 17, the second reflection sheet 23 and the diffuser lenses 19 are attached to the LED substrate 18. Describing in detail, first, as shown in FIG. 10, after the LEDs 17 are mounted at predetermined positions on the LED substrate 18, the second reflection sheet 23 is attached to cover the front side. At this time, the LEDs 17 on the second reflection sheet 23 are inserted into the respective LED insertion holes 23a, and the through holes 18b, 23c in the LED substrate 18 and the second reflection sheet 23 are matched and communicated to each other. After that, as shown in FIG. 11, the diffuser lenses 19 are attached to the LED substrate 18 so as to cover the respective LEDs 17. At this time, the attachment shaft portions 19d of the diffuser lenses 19 are fixedly adhered to the LED substrate 18 with an adhesive through the respective shaft portion insertion holes 23b in the second reflection sheet 23. In this manner, a so-called light source unit U formed by uniting the LEDs 17, the second reflection sheet 23 and the diffuser lenses 19 is manufactured on the LED substrate 18.

Figure 16:
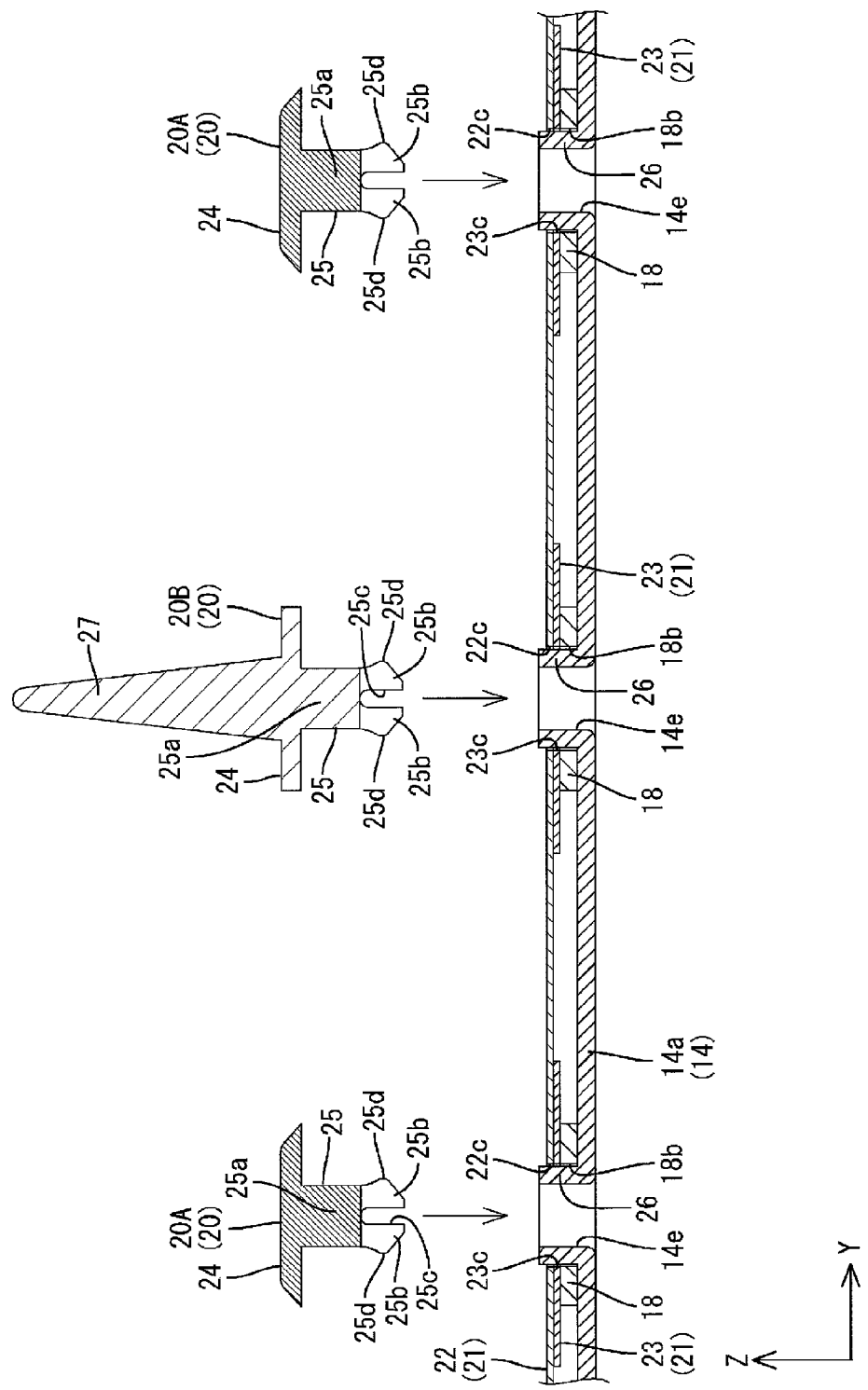
FIG. 16 is a sectional view taken along line ix-ix in FIG. 6 in the state prior to attachment of the holding members to the chassis.

Subsequently, an assembling operation of each constituent to the chassis 14 will be described. First, the light source units U are stored from the front side of the chassis 14 through the openings 14b and are arranged at predetermined attachment positions on the bottom plate 14a. At this time, each restricting part 26 is inserted into the through holes 18b, 23c while positioning the through holes 18b, 23c of the LED substrate 18 and the second reflection sheet 23, respectively, in each of the light source units U with respect to each restricting part 26 rising from the edge of the attachment hole 14e in the bottom plate 14a of the chassis 14 (FIGS. 16 and 17). Since the plurality of through holes 18b, 23c is arranged in the light source unit U in parallel in the X-axis direction (FIG. 11), by brining each restricting part 26 into contact with edges of the through holes 18b, 23c (FIG. 17), the light source unit U (the LED substrate 18 and the second reflection sheet 23) is positioned with respect to the chassis 14 in the X-axis direction and the Y-axis direction in a two-dimensional way. Here, the adjacent LED substrates 18 in the X-axis direction are electrically connected to each other by fitting the adjacent connector portions 18a with each other. The operation of connecting the LED substrates 18 aligned in the X-axis direction to each other is not necessarily performed within the chassis 14, and may be performed outside of the chassis 14.

When arrangement of all of the light source units U is completed, an operation of arranging the first reflection sheet 22 in the chassis 14 is performed. At this time, while positioning the lens insertion holes 22b of the first reflection sheet 22 with respect to the respective diffuser lenses 19 in each light source unit U and positioning the through holes 22c with respect to the respective restricting parts 26 (through holes 18b, 23c), the diffuser lens 19 are inserted into the respective lens insertion holes 22b and the restricting parts 26 are inserted into the respective through holes 22c (FIGS. 16 and 17). Since the plurality of through holes 22c is arranged on the first reflection sheet 22 in parallel in the X-axis direction and the Y-axis direction (FIG. 3), by brining the inserted restricting parts 26 into contact with edges of the respective through holes 22c (FIG. 17), the first reflection sheet 22 is positioned with respect to the chassis 14 in the X-axis direction and the Y-axis direction in a two-dimensional way. At this time, the through hole 22c of the first reflection sheet 22 is matched and communicated to the through hole 23c of the second reflection sheet 23 and the through hole 18b of the LED substrate 18. In this attachment state, the protruding front end of each restricting part 26 protrudes toward the front side further than the front side surface of the first reflection sheet 22 (FIG. 16). When the first reflection sheet 22 is attached, the first reflection sheet 22 is placed from the front side onto almost all portions of the second reflection sheet 23 other than the overlapping portion with the diffuser lens 19 in a plan view (FIGS. 7 and 8). Especially, the edge of the lens insertion hole 22b of the first reflection sheet 22 is entirely placed on the front side of the second reflection sheet 23. After that, the assembling operation of the holding member 20 is performed. Since, prior to assembling of the holding member 20, the reflection sheets 22, 23 and the LED substrate 18 are positioned beforehand with respect to the chassis 14, the assembling operation of the holding member 20 can be smoothly achieved.

In assembling each holding member 20, from the state shown in FIG. 16, the holding member 20 is stored through the openings 14b from the front side of the chassis 14, and the fixed portion 25 is inserted into the attachment hole 14e that exists at a position to be attached. Here, since the restricting part 26 rises from the edge of the attachment hole 14e and protrudes toward the front side farther than the first reflection sheet 22, the operator can smoothly perform the operation using the restricting part 26 as a guide. When the fixed portion 25 is inserted into the opening of the protruding front end of the restricting part 26, the fixed portion 25 passes through the restricting part 26 and reaches the inside of the attachment hole 14e. In this manner, the restricting part 26 can guide the operation of inserting the fixed portion 25 into the attachment hole 14e. In the process of inserting the fixed portion 25, each of the elastic engaged portions 25b is pressed by the restricting part 26 and the edge of the attachment hole 14e, and is elastically deformed to form a hollow in the grooved portion 25c once. Then, when the fixed portion 25 is inserted so that each elastic engaged portion 25b passes through the attachment hole 14e and reaches the back side of the chassis 14, as shown in FIGS. 7 and 9, each elastic engaged portion 25b elastically returns and the engaging portion 25d is engaged with the edge of the attachment hole 14e from the back side. Thereby, the holding member 20 is prevented from being escaped from the chassis 14 and is fixed in the attachment state. In this state, the LED substrate 18 and the reflection sheets 22, 23 are held together with being sandwiched between the body portion 24 of the holding member 20 and the bottom plate 14a of the chassis 14.

In assembling the holding member 20, for the complex function-type holding member 20B of the holding member 20, the supporting portion 27 can be used as the operating portion. With this configuration, in assembling the complex function-type holding member 20B, the operator can operate the complex function-type holding member 20B while holding the supporting portion 27. At this time, since the supporting portion 27 and the fixed portion 25 are located at such a position as to overlap and be concentric with each other in a plan view, the operator can easily know the position of the fixed portion 25. Therefore, the fixed portion 25 can be smoothly inserted into the restricting part 26 (into the attachment holes 14e).

When the holding member 20 is attached as described above, as shown in FIGS. 7 and 9, the protruding end surface of the restricting part 26 is in contact with the back side surface of the body portion 24 (the surface opposite to the first reflection sheet 22). Since the restricting part 26 protrudes toward the front side further than the first reflection sheet 22, the back side surface of the body portion 24 floats from the first reflection sheet 22 and is kept in the non-contact state, and the gap C is generated between the back side surface of the body portion 24 and the front side surface of the first reflection sheet 22, which are opposite to each other, by the protruding dimension of the restricting part 26 from the first reflection sheet 22. Moreover, since the restricting part 26 is located at a position adjacent to the edge of the attachment hole 14e, with which the engaging portions 25d of the elastic engaged portion 25b are engaged, that is, the fixed portion 25b, in a plan view, the restricting part 26 can directly receive possible stress acting upon the body portion 24 with this engagement, thereby preventing the body portion 24 from deforming toward the first reflection sheet 22. As a result, the gap C between the first reflection sheet 22 and the body portion 24 can be kept constant. Further, by inserting the fixed portion 25 into the attachment hole 14e formed in the chassis 14 and mechanically engaging the fixed portion 25 there for fixation, as compared to the case where a fixing method using an adhesive or the like is adopted, fixation can be easily achieved at low costs, and furthermore, the holding member 20 can be easily detached at maintenance and disposal.

As shown in FIG. 3, the holding members 20 thus attached are arranged at different plural places in the long-side direction (X-axis direction) on each LED substrate 18. Thereby, each LED substrate 18 can be stably held. Further, the body portion 24 of the holding member 20 is arranged so as to pass between the adjacent LEDs 17 (the diffuser lenses 19) on the LED substrate 18 as shown in FIG. 7, it is prevented to disturb light emitted from the LED 17.

After that, the optical member 15 is attached to the chassis 14 so as to cover the openings 14b. According to the specific attaching order of the optical member 15, the diffuser 15a, and then, the optical sheets 15b are attached. The optical member 15, as shown in FIGS. 4 and 5, is received by the receiving plates 14d of the chassis 14 at its outer circumference, and is supported by the supporting portion 27 of the complex function-type holding member 20B at its central part. Then, when the frame 16 is attached to the chassis 14, the outer circumference of the optical member 15 is pinched between the frame 16 and the receiving plates 14d. Thereby, manufacturing of the backlight unit 12 is completed. In assembling the manufactured backlight unit 12 and the liquid crystal panel 11, the liquid crystal panel 11 is placed on the frame 16 and then, the bezel 13 is covered on the front side, and they are screwed together. Thereby, the liquid crystal panel 11 is pinched between the frame 16 and bezel 13 and becomes integral with the backlight unit 12, resulting in that manufacturing of the liquid crystal display device 10 is completed.

In using the liquid crystal display device 10 manufactured as described above, each of the LEDs 17 provided in the backlight unit 12 is lighted and an image signal is supplied to the liquid crystal panel 11, thereby displacing a predetermined image on a display screen of the liquid crystal panel 11. As shown in FIGS. 7 and 8, light emitted to light each of the LEDs 17 is first incident on the light incidence surface 19a of the diffuser lens 19. At this time, most of light is incident on an inclined surface of the light incidence-side concave portion 19c of the light incidence surface 19a and thus, into the diffuser lens 19 while being refracted with a wide angle according to the inclined angle. Then, the incident light propagates in the diffuser lens 19 and is emitted from the light emitting surface 19b. However, since the light emitting surface 19b is a substantially flat spherical surface, light is emitted while being further refracted at a boundary with the external air layer with a wider angle. Moreover, since the substantially bowl-like light-emitting side concave portion 19e is formed in a region where the amount of light from the LED 17 is the largest in the light emitting surface 19b, and its circumferential surface is a substantially flat spherical surface, light can be emitted while being refracted at the circumferential surface of the light-emitting side concave portion 19e with a wide angle, or can be reflected toward the LED substrate 18. Since light returned to the LED substrate 18 is reflected toward the diffuser lens 19 by the second reflection sheet 23 and is incident on the diffuser lens 19 once, high brightness can be obtained.

Since the highly directive light emitted from the LED 17 can be diffused with a wide angle by the diffuser lens 19, in-plane distribution of the light reaching the optical member 15 can be made uniform. In other words, since the region between the adjacent LEDs 17 becomes hard to be visually recognized as the dark place by using the diffuser lens 19, the interval between the LEDs 17 can be increased, thereby reducing the number of installed LEDs 17 while suppressing unevenness brightness. Then, since the interval between the adjacent LEDs 17 can be increased by reducing the number of installed LEDs 17, the holding member 20 can be located in the wider region, and furthermore, the holding member 20 can fix the LED substrate 18.

In using the liquid crystal display device 10 as described above, since each of the LEDs 17 in the backlight unit is lighted on or off, internal temperature environment changes and thus, each constituent of the liquid crystal display device 10 may be thermally expanded or thermally contracted. In the case where the first reflection sheet 22 and the second reflection sheet 23 among the constituents are thermally expanded or thermally contracted, when local deformation such as wrinkle or flexure is generated, unevenness is easy to occur in reflected light and unevenness brightness occurs in light emitted from the backlight unit 12, possibly exerting a negative effect on display quality. Further, in the case where the LED substrate 18 is thermally expanded or thermally contracted, when local deformation such as warp and flexure is generated, contact failure occurs in the connector portions 18a, resulting in deficiency in controlling of lighting of the LED 17. Such local deformation that can occur in the reflection sheets 22, 23 and the LED substrate 18 is caused due to restriction of expansion and contraction by the pressing force exerted when the reflection sheets 22, 23 and the LED substrate 18 are sandwiched between the chassis 14 and the holding member 20.

In this embodiment, as shown in FIG. 9, by bringing the restricting part 26 provided at the chassis 14 into contact with the body portion 24 of the holding member 20, the predetermined gap C is held between the body portion 24 and the opposing first reflection sheet 22, and the body portion 24 and the first reflection sheet 22 are kept in the non-contact state. For this reason, it is prevented that the pressing force acts upon the first reflection sheet 22 from the side of the holding member 20. Then, since the second reflection sheet 23 and the LED substrate 18 are located closer to the chassis 14 than the first reflection sheet 22, as in the first reflection sheet 22, it is prevented that the pressing force acts upon the second reflection sheet 23 and the LED substrate 18 from the side of the holding member 20. Accordingly, expansion or contraction of the reflection sheets 22, 23 and the LED substrate 18, which is due to thermal expansion or thermal contraction, is hardly disturbed and thus, the degree of flexibility in expansion and contraction is extremely high. Thereby, the reflection sheets 22, 23 and the LED substrate 18 can freely expand or contract due to thermal expansion or thermal contraction according to change in the thermal environment, thereby preventing local deformation. In other words, since the reflection sheets 22, 23 and the LED substrate 18 can be freely expanded or contracted in the almost entire range, and can accommodate flexure or warp, which can be caused due to the expansion and contraction, flatness as an entirety is ensured, resulting in that local flexure or warp is preferably prevented.

As described above, the backlight unit 12 according to this embodiment includes the LEDs 17 as the light source, the chassis 14 that stores the LEDs 17 therein, the reflection sheet 21 and the LED substrate 18 as the extending member extending along the inner surface of the chassis 14, the holding member 20 that sandwiches the reflection sheet 21 and the LED substrate 18 between the holding member 20 and the chassis 14 and is fixed to the chassis 14, and the restricting part 26 restricting positional relationship of the holding member 20 with respect to the reflection sheet 21 and the LED substrate 18 such that the gap C is held between the holding member 20 and the reflection sheet 21.

With this configuration, when the holding member 20 is fixed to the chassis 14, the reflection sheet 21 and the LED substrate 18 are held with being sandwiched between the holding member 20 and the chassis 14. Positional relationship of the holding member 20 with respect to the reflection sheet 21 and the LED substrate 18 is restricted by the restricting part 26, thereby generating the gap C between the holding member 20 and the reflection sheet 21, and therefore, the reflection sheet 21 and the LED substrate 18 are easy to expand or contract when thermal expansion or thermal contraction occurs due to the change in the thermal environment. Thereby, local deformation such as warp and flexure becomes hard to occur in the reflection sheet 21 and the LED substrate 18.

The restricting part 26 is located at such a position as to overlap the reflection sheet 21 and the LED substrate 18 in a plan view, and the reflection sheet 21 and the LED substrate 18 are provided with the through holes 18b, 22c, 23c passing the restricting part 26 therethrough. With this configuration, by inserting the restricting part 26 into the through holes 18b, 22c, 23c, the reflection sheet 21 and the LED substrate 18 can be positioned with respect to the restricting part 26.

The holding member 20 includes the body portion 24 that sandwiches the reflection sheet 21 and the LED substrate 18 between the body portion 24 and the chassis 14, and the fixed portion 25 that protrudes from the body portion 24 toward the chassis 14 and is fixed to the chassis 14, and the through holes 18b, 22c, 23c each can pass both the fixed portion 25 and the restricting part 26 therethrough. With this configuration, since both the restricting part 26 and the fixed portion 25 are inserted into the through holes 18b, 22c, 23c, as compared to the case where the through holes passing the fixed portion 25 therethrough and the through holes passing the restricting part 26 therethrough are provided in the reflection sheet and the LED substrate, configuration of the reflection sheet 21 and the LED substrate 18 is simplified, thereby enabling reduction of manufacturing costs of the reflection sheet 21 and the LED substrate 18.

The restricting part 26 is located at a position adjacent to the fixed portion 25 in a plan view. With this configuration, as compared to the case where the restricting part is separated from the fixed portion in the body portion 24, the through holes 18b, 22c, 23c can be reduced in size.

The holding member 20 includes the body portion 24 that sandwiches the reflection sheet 21 and the LED substrate 18 between the body portion 24 and the chassis 14, and the fixed portion 25 that protrudes from the body portion 24 toward the chassis 14 and is fixed to the chassis 14, and the restricting part 26 is located at a position adjacent to the fixed portion in a plan view. With this configuration, since the restricting part 26 and the fixed portion 25 are located at a position adjacent to each other in a plan view, stress caused by fixation of the fixed portion 25 to the chassis 14 directly acts upon the portion of the holding member 20, which is adjacent to the fixed portion 25, positional relationship of the holding member 20 with respect to the reflection sheet 21 and the LED substrate 18 can be properly restricted.

The restricting part 26 is provided integrally with the chassis 14 and protrudes toward the holding member 20 to be in direct contact with the holding member 20. With this configuration, by bringing the restricting part 26 provided integrally with the chassis 14 into in direct contact with the holding member 20, positional relationship of the holding member 20 with respect to the reflection sheet 21 and the LED substrate 18 can be well restricted.

The restricting part 26 is provided integrally with the chassis 14. With this configuration, since the restricting part 26 is provided integrally with the chassis 14, as compared to the case where the restricting part is an individual component separated from the chassis 14, the number of components and the number of assembling steps can be reduced, which is preferable for cost reduction.

The restricting part 26 is located at such a position as to overlap the reflection sheet 21 and the LED substrate 18 in a plan view, and the reflection sheet 21 and the LED substrate 18 are provided with the through holes 18b, 22c, 23c passing the restricting part 26 therethrough. With this configuration, when the reflection sheet 21 and the LED substrate 18 are arranged at the chassis 14, by inserting the restricting part 26 into the through holes 18b, 22c, 23c, the reflection sheet 21 and the LED substrate 18 can be positioned with respect to the chassis 14. That is, prior to attachment of the holding member 20, the reflection sheet 21 and the LED substrate 18 can be positioned. Thereby, attachment workability of the holding member 20 can be improved.

The holding member 20 includes the body portion 24 that sandwiches the reflection sheet 21 and the LED substrate 18 between the body portion 24 and the chassis 14, and the fixed portion 25 that protrudes from the body portion 24 toward the chassis 14 and is fixed to the chassis 14. The chassis 14 is provided with the attachment holes 14e passing the fixed portion 25 therethrough, and the restricting part 26 is provided at the edge of the attachment hole 14e. With this configuration, in inserting the fixed portion 25 into the attachment hole 14e of the chassis 14, the restricting part 26 arranged at the edge of the attachment hole 14e can guide the operation of inserting the fixed portion 25. Thereby, attachment workability of the holding member 20 can be improved.

The restricting part 26 is annularly formed along the edge of the attachment hole 14e. With this configuration, since the strength of the restricting part 26 can be kept high, positional relationship of the holding member 20 with respect to the reflection sheet 21 and the LED substrate 18 can reliably be restricted.

The extending member is the LED substrate 18 having the LED 17. With this configuration, since the LED substrate 18 is easy to expand or contract due to thermal expansion or thermal contraction, a contact failure is hard to occur at the connecting part with external circuit or the like, and malfunction in controlling lighting of the LED 17 can be prevented.

The plurality of LED 17 is arranged on the LED substrate 18 in parallel. With this configuration, the plurality of LED 17 can be efficiently arranged on the LED substrate 18, which is suitable for higher brightness.

The holding member 20 is arranged between the adjacent LEDs 17. With this configuration, space between the adjacent LEDs 17 can be efficiently used. Further, it is prevented the holding member 20 from disturbing light emitted from the LEDs 17.

The extending member is the reflection sheet 21 that reflects light from the LED 17. With this configuration, since the reflection sheet 21 is easy to expand or contract due to thermal expansion or thermal contraction, unevenness in light reflected by the reflection sheet 21 is hard to occur.

The extending member is constituted of the LED substrate 18 including the LEDs 17 and the reflection sheet 21 reflecting light from the LEDs 17, and the LED substrate 18 and the reflection sheet 21 are sandwiched in the piled state between the holding member 20 and the chassis 14. With this configuration, the holding member 20 can hold the LED substrate 18 and the reflection sheet 21 together. Moreover, since the LED substrate 18 and the reflection sheet 21 are easy to expand or contract due to thermal expansion and thermal contraction, deformation such as warp and flexure is hard to occur.

The reflection sheet 21 is arranged on the LED substrates 18 on the side opposite to the chassis 14, and has the lens insertion holes 22b and the LED insertion holes 23a, into which the LEDs 17 are inserted, at positions where these holes overlap the LEDs 17 in a plan view. With this configuration, since light is reflected by the reflection sheet 21 located on the LED substrate 18 on the side opposite to the chassis 14, light can be used more efficiently, which is suitable for improvement of brightness. Further, since the reflection sheet 21 includes the lens insertion hole 22b and the LED insertion hole 23a, it is prevented to disturb light emission from the LED 17.

The diffuser lenses 19 diffusing light from the LEDs 17 are located at such a position as to overlap the LEDs 17 in a plan view on the LED substrate 18 on the side opposite to the chassis 14. With this configuration, light emitted from the LEDs 17 can be diffused by the diffuser lenses 19 and then, emitted. Thereby, unevenness in the emitted light is hard to occur.

The reflection sheet 21 is constituted of the first reflection sheet 22 including the lens insertion hole 22b that can pass the diffuser lens 19 therethrough, and the second reflection sheet 23 that is interposed between the LED substrate 18 and the diffuser lens 19, is located at such a position as to overlap the lens insertion hole 22b provided in the first reflection sheet 22 in a plan view (arranged in the lens insertion hole 22b in a plan view) and reflects light toward the diffuser lens 19. With this configuration, even when the first reflection sheet 22 is provided with the lens insertion hole 22b that can pass the diffuser lens 19 therethrough, light can be reflected toward the diffuser lens 19 by the second reflection sheet 23 located at such a position as to overlap the lens insertion hole 22b (arranged in the lens insertion hole 22b in a plan view). As a result, light can be efficiently utilized, which is preferable for improvement of brightness.

The edge of the lens insertion hole 22b of the first reflection sheet 22 and the second reflection sheet 23 are formed so as to overlap each other in a plan view. With this configuration, the edge of the lens insertion hole 22b of the first reflection sheet 22 and the second reflection sheet 23 are connected to each other in a plan view without any gap. Thus, light can be used more efficiently.

The holding member 20 includes the body portion 24 that sandwiches the reflection sheet 21 and the LED substrate 18 between the body portion 24 and the chassis 14, and the fixed portion 25 that protrudes from the body portion 24 toward the chassis 14 and is fixed to the chassis 14. With this configuration, when the fixed portion 25 is fixed to the chassis 14, the reflection sheet 21 and the LED substrate 18, which are sandwiched between the body portion 24 and the chassis 14, are suitably held.

The fixed portion 25 passes through the chassis 14 and is engaged with the chassis 14 from the side opposite to the reflection sheet 21 and the LED substrate 18. With this configuration, since the holding member 20 and the LED substrate 18 can be fixed by engaging the fixed portion 25 passing through the chassis 14 with the chassis 14, it is no need to use another fixing means such as adhesive and therefore, fixation can be easily achieved at low costs.

The optical member 15 is located at a position opposite to the LEDs 17, and the body portion 24 of the complex-type holding member 20B is provided with the supporting portion 27 that protrudes toward the optical member 15 and supports the optical member 15. With this configuration, the complex-type holding member 20B holding the reflection sheet and the LED substrate 18 can also have the function of supporting the optical member 15.

The fixed portion 25 and the supporting portion 27 are located at such a position as to overlap with each other in a plan view. With this configuration, when the operator attaches the complex-type holding member 20B while holding the supporting portion 27, the position of the fixed portion 25 can be easily recognized, which is excellent in workability.

The fixed portion 25 and the supporting portion 27 are located so as to be concentric with each other. With this configuration, workability is further improved.

Second Embodiment

A second embodiment of the present invention will be described below with reference to FIG. 18 or FIG. 19. In the second embodiment, a restricting part 126 is provide on the side of a holding member 120. Overlapping description of the same configuration, actions and effects as those in the first embodiment is omitted.

Figure 19:
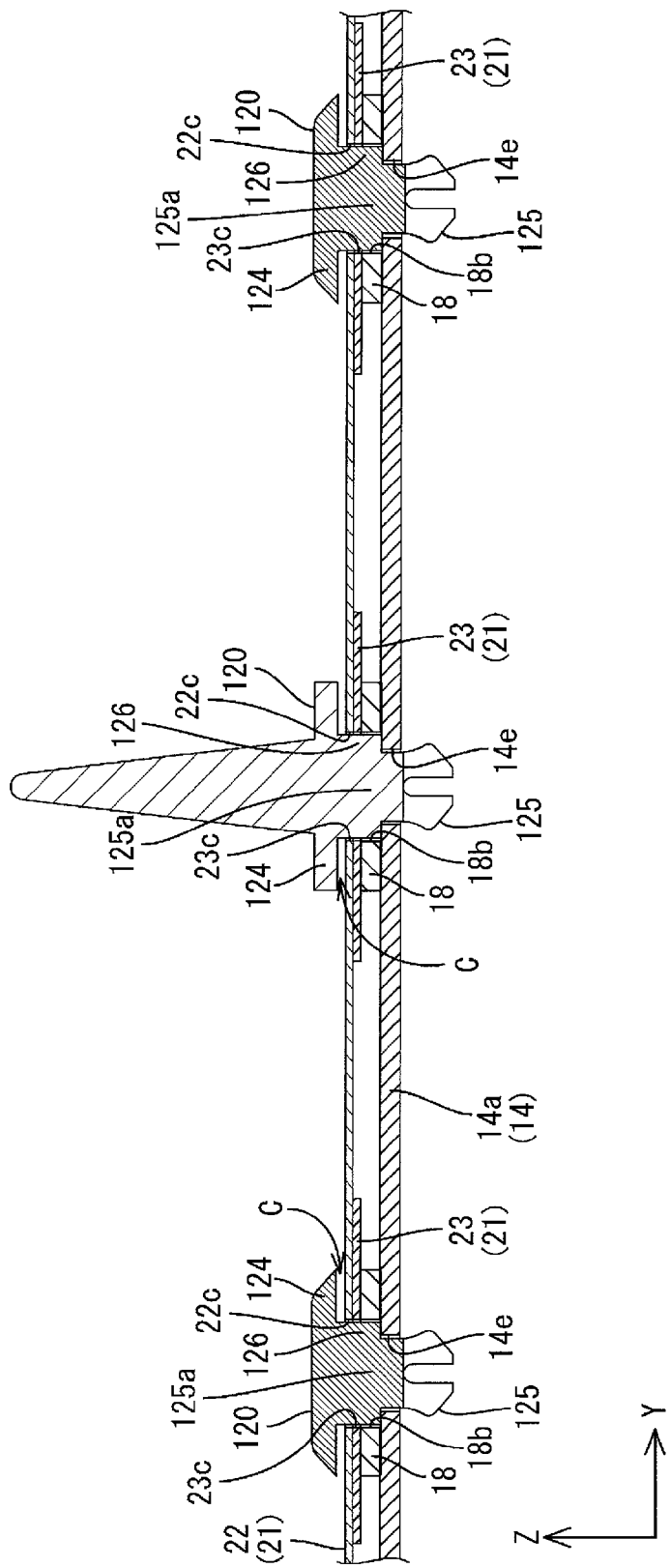
FIG. 19 is a sectional view showing the state where the holding members are attached to the chassis.

As shown in FIG. 19, the restricting part 126 is provided integrally with the holding member 120. The restricting part 126 protrudes from a back side surface of a body portion 124 toward the back side, and the protruding end surface is in direct contact with the back side surface of the body portion 124 (the surface facing the holding member 120), resulting in that the body portion 124 floats from the first reflection sheet 22 and is kept in a non-contact state, and has a gap C between the first reflection sheet 22 and the body portion 124. Protruding dimension of the restricting part 126 from the body portion 124 is set to be larger than the sum of thicknesses of the reflection sheets 22, 23 and the LED substrate 18, and the gap C having size corresponding to a difference in dimension. As described above, the holding member 120 does not directly press the reflection sheets 22, 23 and the LED substrate 18 from the front side and thus, hardly applies a pressing force (stress) to the reflection sheets 22, 23 and the LED substrate 18.

Figure 18:
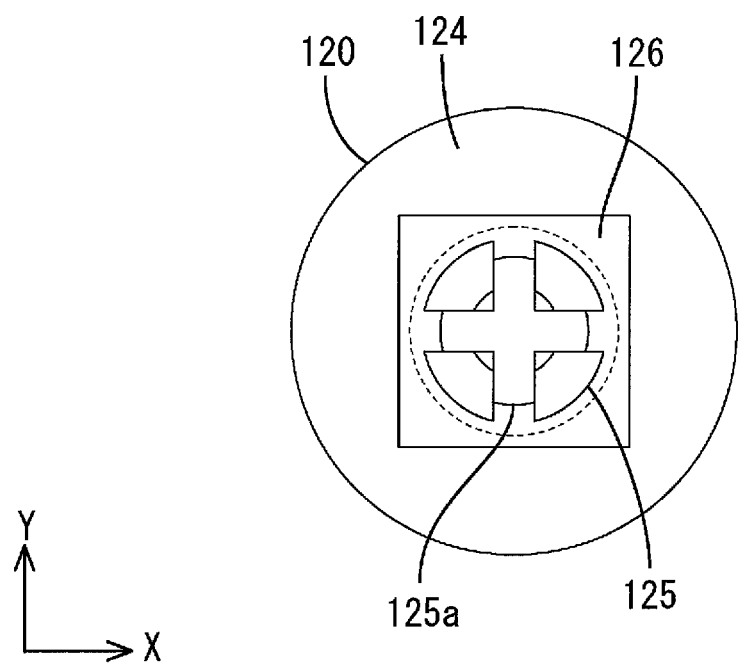
FIG. 18 is a bottom view showing a holding member according to a second embodiment of the present invention.

As shown in FIGS. 18 and 19, the restricting part 126 is located at a position adjacent to a fixed portion 125 of the body portion 124, and is connected to the fixed portion 125. Describing in detail, the restricting part 126 surrounds the entire periphery of a bottom portion 125a of the fixed portion 125 (forms a ring in a plan view) and is coupled to the bottom portion 125a. The diameter of a coupling bottom end of the bottom portion 125a of the fixed portion 125 to the body portion 124 is partially enlarged by a contact portion 126. Thereby, the fixed portion 125 is reinforced. The restricting part 126 is quadrate in a plan view. As in the first embodiment, the through holes 18b, 22c, 23c that can pass both the fixed portion 125 and the restricting part 126 therethrough are formed in the reflection sheets 22, 23 and the LED substrate 18, and each have the outer shape that is quadrate in a plan view so as to conform to the restricting part 126 and the diameter that is larger than the diameter of the attachment hole 14e of the chassis 14. Specific shape of the restricting part 126 and the through holes 18b, 22c, 23c may be changed as appropriate, for example, to circle, ellipse and the like. The protruding end surface of the restricting part 126 is in contact with the edge of the attachment hole 14e of the bottom plate 14a of the chassis 14. That is, the restricting part 126 is located at such a position as to overlap the edge of the attachment hole 14e in a plan view. The contact region of the restricting part 126 on the bottom plate 14a is shaped like a ring having a width corresponding to difference between the diameter of the attachment holes 14e and each of the through holes 18b, 22c, 23c.

As described above, in this embodiment, the restricting part 126 is integrally provided on the side of the holding member 120, protrudes toward the chassis 14 and is in direct contact with the chassis 14. With this configuration, by bringing the restricting part 126 integrally provided on the side of the holding member 120 into direct contact with the chassis 14, positional relationship of the holding member 120 with respect to the reflection sheet 21 and the LED substrate 18 in the Z-axis direction can be suitably restricted.

The restricting part 126 is provided integrally with the holding member 120. With this configuration, since the restricting part 126 is provided integrally with the holding member 120, as compared to the case where the restricting part is an individual component separated from the holding member 120, the number of components and the number of assembling steps can be reduced, which is preferable for cost reduction.

The holding member 120 includes the body portion 124 that sandwiches the reflection sheet 21 and the LED substrate 18 between the body portion 24 and the chassis 14, and the fixed portion 125 that protrudes from the body portion 24 toward the chassis 14 and is fixed to the chassis 14, and the restricting part 126 is provided at the body portion 124. With this configuration, when the fixed portion 125 is fixed to the chassis 14, the reflection sheet 21 and the LED substrate 18, which are sandwiched between the body portion 124 and the chassis 14, are suitably held. At this time, positional relationship of the holding member 20 with respect to the reflection sheet 21 and the LED substrate 18 can be properly restricted by the restricting part 126 provided at the body portion 124.

The restricting part 126 is connected to the fixed portion 125. With this configuration, as compared to the case where the restricting part is separated from the fixed portion 125, the strength of the restricting part 126 and the fixed portion 125 can be increased.

The restricting part 126 surrounds the fixed portion 125. With this configuration, the strength of the restricting part 126 and the fixed portion 125 can be further increased.

Although the second embodiment of the present invention has been described, the present invention is not limited to this embodiment and for example, may include the following modification examples. In each of the following modification examples, the same members as those in the above-mentioned embodiment are given the same reference numerals and illustration and description thereof may be omitted.

First Modification Example of Second Embodiment

A first modification example of the second embodiment will be described with reference to FIG. 20. Here, a restricting part 126-1 and an LED substrate 118 are modified in shape.

Figure 20:
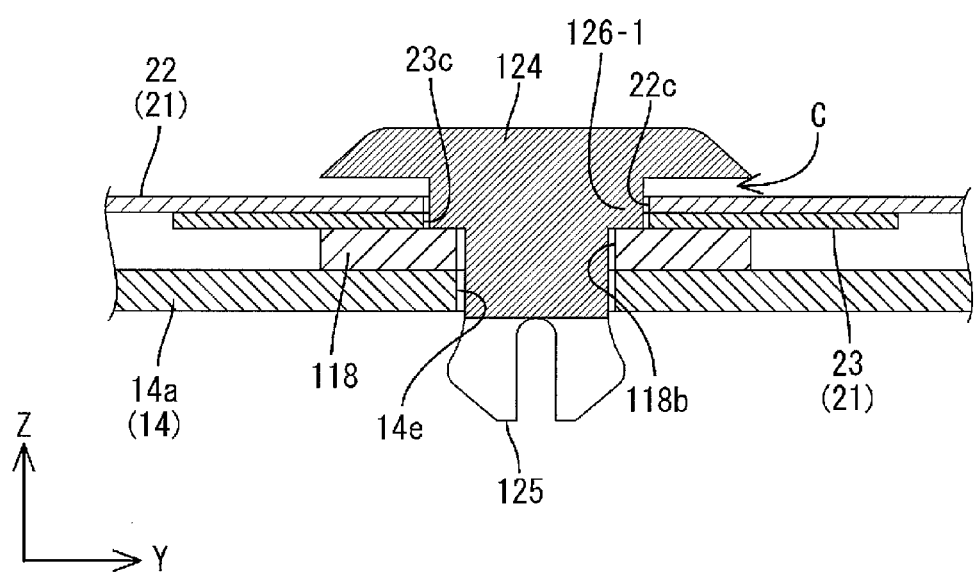
FIG. 20 is a sectional view showing the state where a holding member according to a first modification example of the second embodiment is attached to the chassis.

In the restricting part 126-1, as shown in FIG. 20, its protruding end surface is in direct contact with the LED substrate 118 and is in indirect contact with the chassis 14. Describing in detail, the protruding dimension of the restricting part 126-1 from the body portion 124 is larger than the sum of thicknesses of the first reflection sheet 22 and the second reflection sheet 23, but is smaller than that of the restricting part 126 described in the second embodiment by the thickness of the LED substrate 118. The diameter of a through hole 118b formed in the LED substrate 118 is almost equal to that of the attachment hole 14e of the chassis 14 and is smaller than that of each of the through holes 22c, 23c formed in the first reflection sheet 22 and the second reflection sheet 23, respectively. That is, each of the through holes 22c, 23c of the first reflection sheet 22 and the second reflection sheet allows insertion of both the fixed portion 125 and the restricting part 126-1, while the through hole 118b of the LED substrate 118 allows insertion of only the fixed portion 125. Then, since the protruding end surface of the restricting part 126-1 is in contact with the edge of the through hole 118b of the LED substrate 118, the gap C is held between the body portion 124 and the first reflection sheet 22. Thereby, the degree of flexibility in expansion and contraction of the reflection sheet 21 can be kept high. Since the LED substrate 118 has a lower degree of flexibility in expansion and contraction than the reflection sheet 21 as the LED substrate 118 is retained by the restricting part 126-1. However, since the restricting part 126-1 partially protrudes from the body portion 124 and its contact area is smaller as compared to the case the whole of the body portion is in contact, the degree of flexibility in expansion and contraction can be ensured to some extent.

Second Modification Example of Second Embodiment

A second modification example of the second embodiment will be described with reference to FIG. 21. Here, a restricting part 126-2 and a second reflection sheet 123 are modifications in shape from those in the first modification example.

Figure 21:
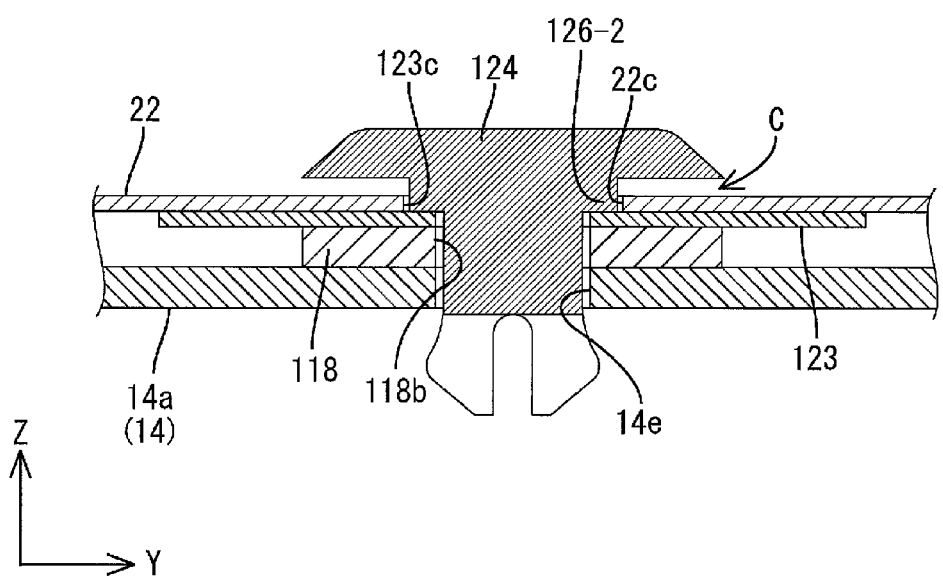
FIG. 21 is a sectional view showing the state where a holding member according to a second modification example of the second embodiment is attached to the chassis.

In the restricting part 126-2, as shown in FIG. 21, its protruding end surface is in direct contact with the second reflection sheet 123 and is in indirect contact with the chassis 14. Describing in detail, the protruding dimension of the restricting part 126-2 from the body portion 124 is larger than the thickness of the first reflection sheet 22, but is smaller than that of the restricting part 126-1 described in the first modification example by the thickness of the second reflection sheet 123. The diameter of a through hole 123c formed in the second reflection sheet 123 is almost equal to that of the attachment holes 14e of the chassis 14 and the through hole 118b of the LED substrate 118 and is smaller than the through hole 22c of the first reflection sheet 22. That is, the through hole 22c of the first reflection sheet 22 allows insertion of both the fixed portion 125 and the restricting part 126-2, while the through hole 118b, 123c of the LED substrate 118 and the second reflection sheet 123 allows insertion of only the fixed portion 125. Since the protruding end surface of the restricting part 126-2 is in contact with the edge of the through hole 123c of the second reflection sheet 123, the gap C is held between the body portion 124 and the first reflection sheet 22. Thereby, the degree of flexibility in expansion and contraction of the first reflection sheet 22 can be kept high. Moreover, although the LED substrate 118 and the second reflection sheet 123 have a lower degree of flexibility in expansion and contraction than the first reflection sheet 22 as the LED substrate 118 and the second reflection sheet 123 are retained by the restricting part 126-2, the degree of flexibility in expansion and contraction can be ensured to some extent for the same reason as in the first modification example.

Third Embodiment

Figure 23:
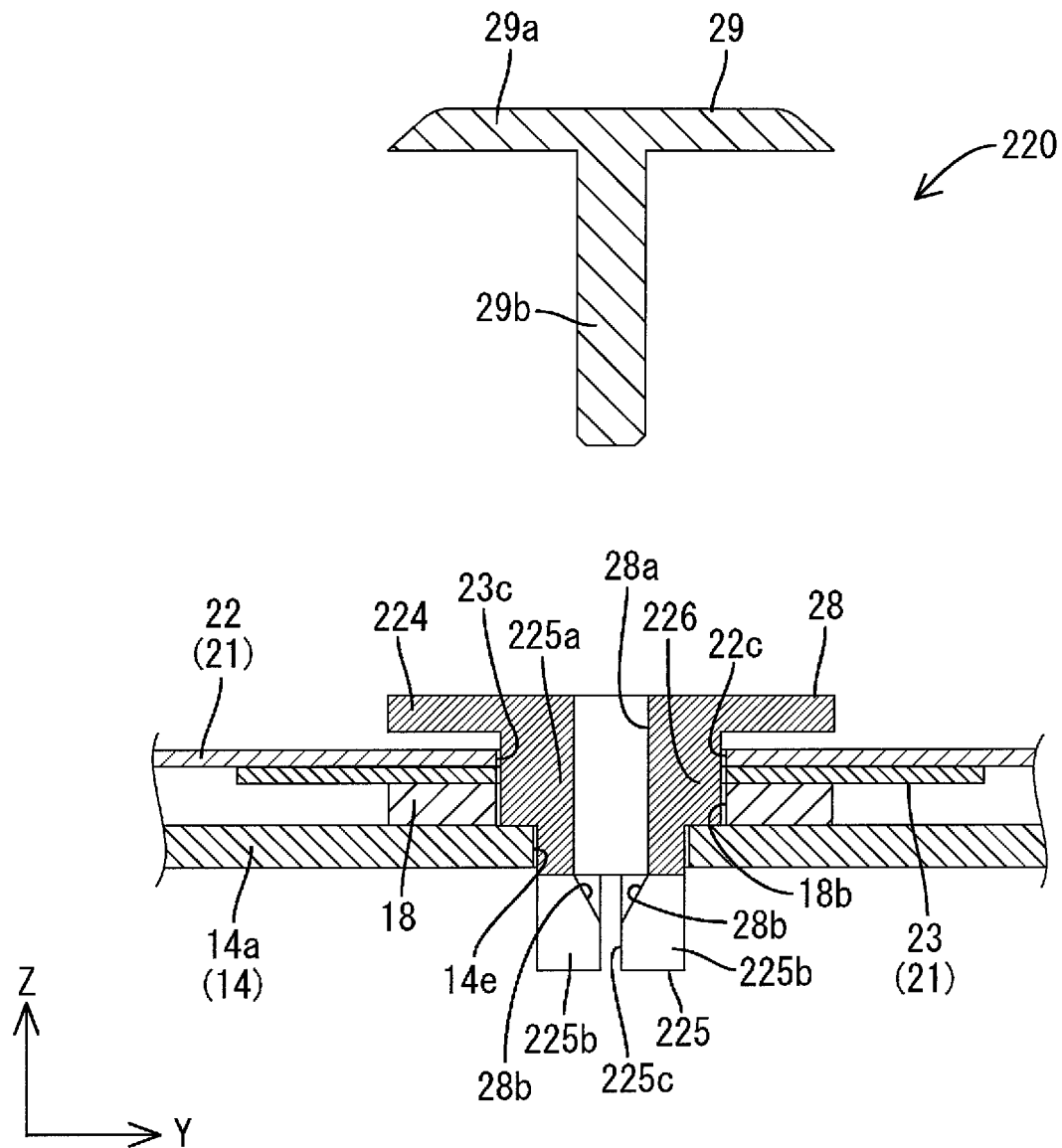
FIG. 23 is a sectional view showing the state where a first component of the holding member is attached to the chassis.
Figure 24:
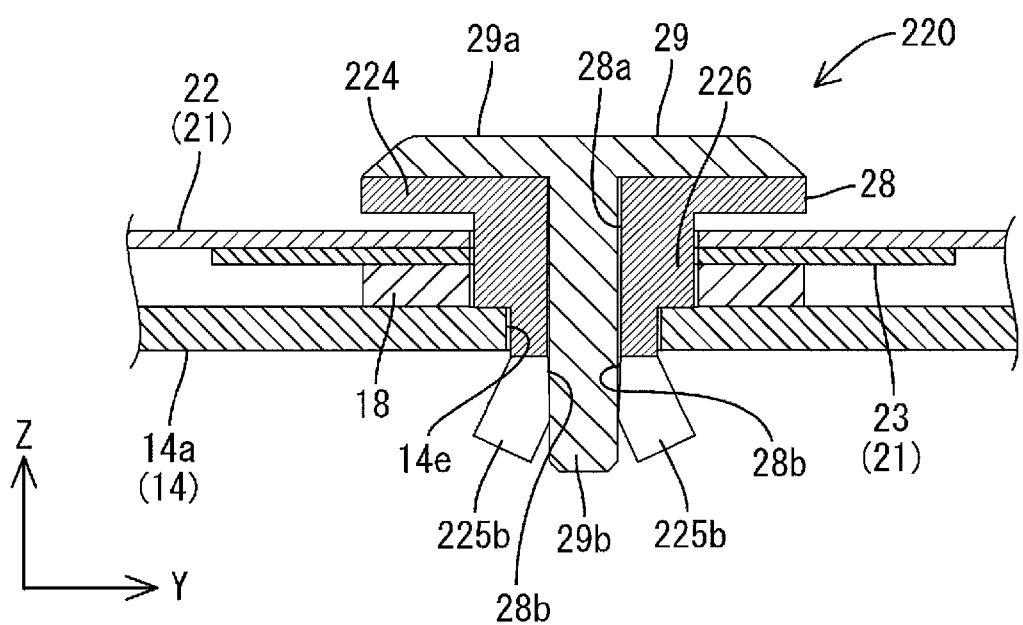
FIG. 24 is a sectional view showing the state where a second component is attached to the first component.

A third embodiment of the present invention will be described below with reference to FIGS. 22 to 24. In the third embodiment, a holding member 220 is modified in shape from that in the second embodiment. Overlapping description of the same configuration, actions and effects as those in the first and second embodiments is omitted.

Figure 22:
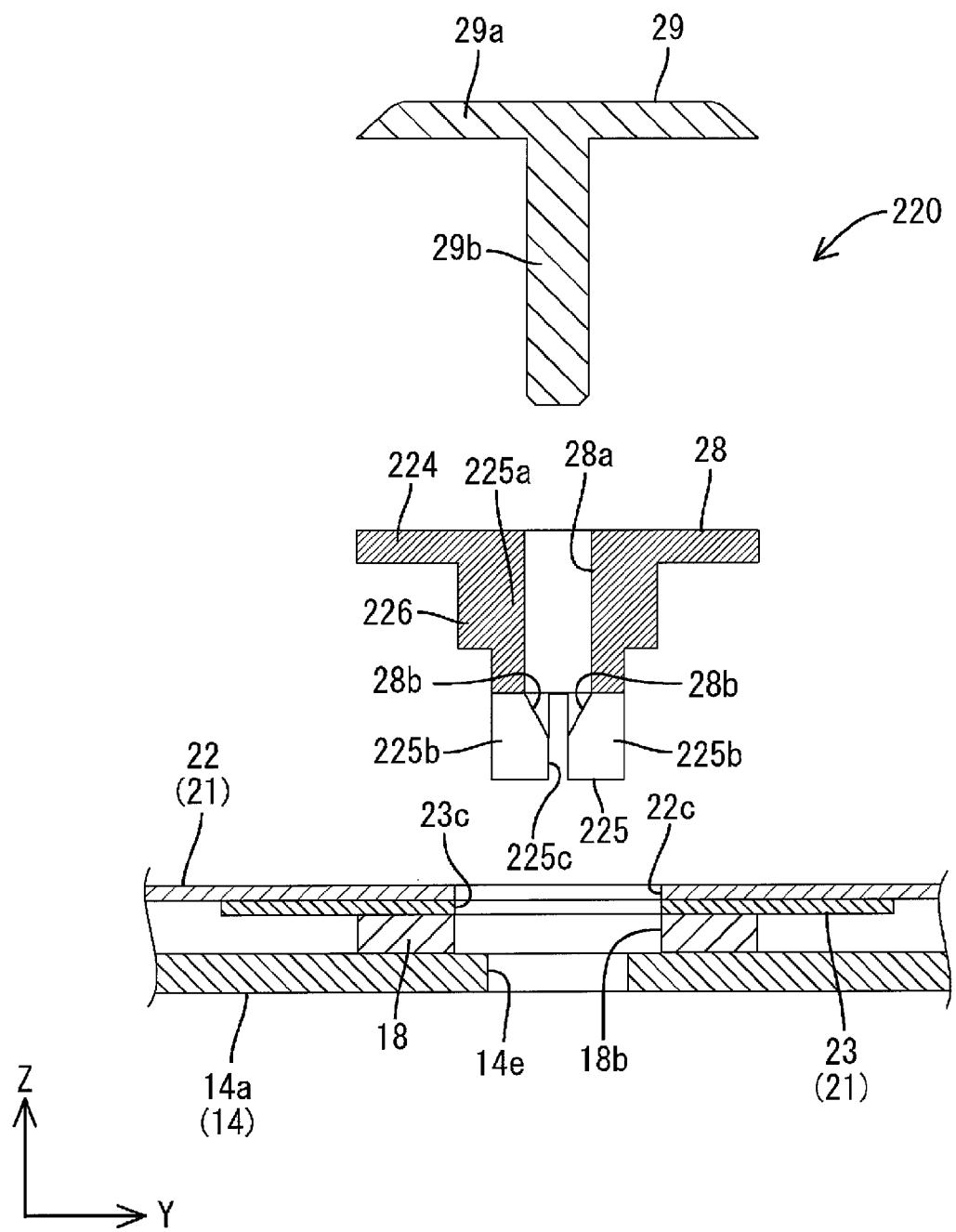
FIG. 22 is a sectional view showing the state prior to attachment of a holding member according to a third embodiment of the present invention to the chassis.

The holding member 220, as shown in FIG. 22, is configured of two components: a first component 28 including a body portion 224 and a fixed portion 225 and a second component 29 attachably and detachably assembled to the first component 28 from the front side. The first component 28 is provided with an attaching opening 28a for attaching the second component 29, which is opened on the front side. The attaching opening 28a passes through the body portion 224 of the first component 28, and has a depth over the entire length of a bottom portion 225a of the fixed portion 225. Accordingly, the attaching opening 28a is connected to a grooved portion 225c formed on the fixed portion 225. That is, the attaching opening 28a is also opened to the back side through the grooved portion 225c. The attaching opening 28a has a circular cross section. An inclined surface 28b facing the attaching opening 28a is provided on an inner surface of each elastic engaged portion 225b forming the fixed portion 225. The inclined surface 28b is arranged at a protruding bottom end of the elastic engaged portion 225b. The inclined surface 28b is gradually inclined inward from the protruding bottom end of the elastic engaged portion 225b toward the protruding front end, so that the protruding bottom end of the elastic engaged portion 225b becomes narrower toward the protruding front end side and becomes wider toward the protruding front end side. The diameter of the fixed portion 225 is substantially constant over the entire length, and is slightly smaller than that of the attachment hole 14e of the chassis 14. The engaging portion 25d as in first embodiment is not provided at each elastic engaged portion 225b. A restricting part 226 is provided integrally with the body portion 224, surrounds the bottom portion 225a of the fixed portion 225 and is connected to the bottom portion 225a. The diameter of each of the through holes 22c, 23c, 18b of the reflection sheets 22, 23 and the LED substrate 18 is so large as to allow insertion of the fixed portion 225 and the restricting part 226, and is smaller than the diameter of the attachment hole 14e.

The second component 29 has a substantially T-shaped cross section, and includes a bottom portion 29a extending in parallel to the body portion 224 of the first component 28 and a shaft portion 29b protruding from the bottom portion 29a toward the back side. The bottom portion 29a is substantially circular in a plan view, and has the almost same dimension of the body portion 224 of the first component 28. The shaft portion 29b is shaped like a cylinder having a substantially constant diameter over the entire length, and has the protruding dimension from the bottom portion 29a, which is the almost same as the dimension of the first component 28 in the Z-axis direction. The shaft portion 29b has the diameter that is slightly smaller than the attaching opening 28a of the first component 28 and thus, can be inserted into or pulled out of the attaching opening 28a.

Subsequently, the operation of attaching the holding member 220 with the above-mentioned configuration to the chassis 14 will be described. First, as shown in FIG. 23, first, the first component 28 is attached to the chassis 14. At this time, the fixed portion 225 and the restricting part 226 of the first component 28 are inserted into the through holes 18b, 22c, 23c of the reflection sheets 22, 23 and the LED substrate 18 and then, the protruding end surface of the restricting part 226 is brought into contact with the edge of the attachment hole 14e of the chassis 14 and the fixed portion 225 is inserted into the attachment hole 14e of the chassis 14. In this state, the fixed portion 225 is not engaged with the chassis 14. Next, the second component 29 is attached to the first component 28 from the front side. When the shaft portion 29b of the second component 29 is inserted into the attaching opening 28a of the first component 28 from the front side and reaches a predetermined depth, a front end of the shaft portion 29b contacts the inclined surface 28b of each elastic engaged portion 225b. When the second component 29 is further inserted in this state, as shown in FIG. 24, the inclined surface 28b is pressed by the front end of the shaft portion 29b, and each elastic engaged portion 225b is elastically deformed along the inclination so as to extend outward. That is, each elastic engaged portion 225b is extended by the shaft portion 29b to be elastically deformed and is engaged with the edge of the attachment hole 14e. Each elastic engaged portion 225b is restricted from being elastically returned inward (deformed to be closed) by the shaft portion 29b arranged inside of the elastic engaged portion 225b. This can prevent the phenomenon that the holding member 220 is carelessly detached from the chassis 14. When each elastic engaged portion 225b is pressed by the shaft portion 29b, each elastic engaged portion 225b may be subjected to plastic deformation.

As described above, in this embodiment, the fixed portion 225 includes the elastic engaged portion 225b configured to be elastically deformable and is engaged on the side opposite to the reflection sheet 21 and the LED substrate 18 passing through the chassis 14, and the holding member 220 is constituted of the first component 28 having the body portion 224 and the fixed portion 225, and the second component 29 that is attached to the first component 28 and restricts elastic deformation of the elastic engaged portion 225b. With this configuration, when the second component 29 is attached to the first component 28 in the case where the first component 28 is attached to the chassis 14, elastic deformation of the elastic engaged portion 225b engaged on the side opposite to the reflection sheet 21 and the LED substrate 18 passing through the chassis 14 is restricted. Thereby, the holding member 220 can be strongly prevented from being detached from the chassis 14.

Fourth Embodiment

A fourth embodiment of the present invention will be described below with reference to FIG. 25. In the fourth embodiment, a modified restricting part 326 is shown. Overlapping description of the same configuration, actions and effects as those in the first embodiment is omitted.

Figure 25:
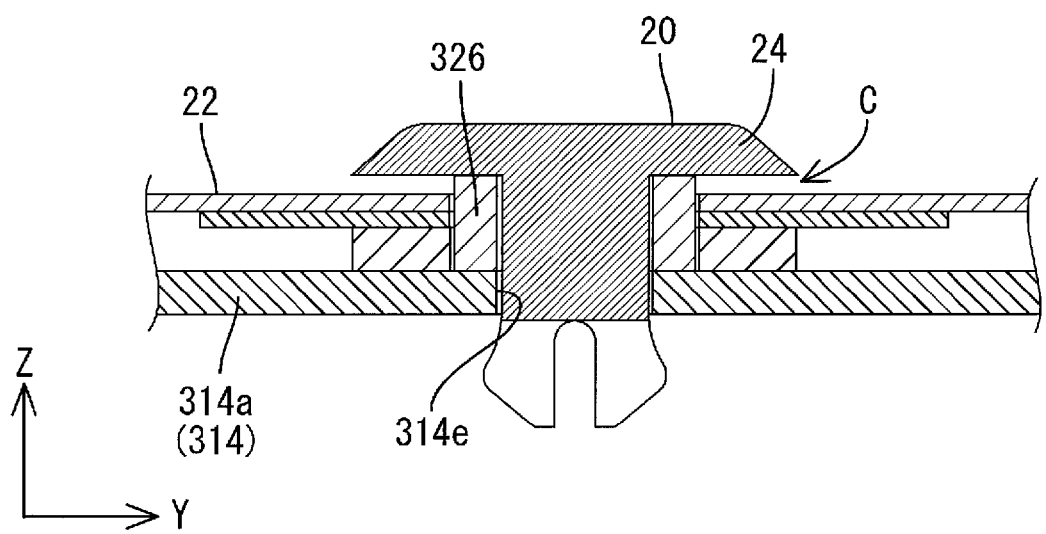
FIG. 25 is a sectional view showing the state prior to attachment of a holding member according to a fourth embodiment of the present invention to the chassis.

As shown in FIG. 25, the restricting part 326 is an individual component separated from a chassis 314 and the holding member 20. The restricting part 326 is interposed between a bottom plate 314a of the chassis 314 and the body portion 24 of the holding member 20, thereby restricting positional relationship between the holding member 20 and the first reflection sheet 22 in the Z-axis direction and holding the predetermined gap C between the body portion 24 and the first reflection sheet 22. The restricting part 326 is integrally attached to the chassis 314 with an adhesive or the like. With this configuration, the restricting part 326 as the separate component can be dealt integrally with the chassis 314. Although not shown, the restricting part 326 can be integrally attached to the holding member 20, or the restricting part 326 can be provided so as not to be integral with both the chassis 314 and the holding member 20 without using fixing means such as adhesive.

As described above, in this embodiment, the restricting part 326 is the individual component separated from the chassis 314 and the holding member 20, and is interposed between the chassis 314 and the holding member 20. With this configuration, since the restricting part 326 is the individual component separated from the chassis 314 and the holding member 20, the degree of flexibility in setting material for the restricting part 326 and shape of the restricting part 326 can be improved.

Fifth Embodiment

A fifth embodiment of the present invention will be described below with reference to FIG. 26 or FIG. 27. In the fifth embodiment, the second reflection sheet 23 in the first embodiment is omitted. Overlapping description of the same configuration, actions and effects as those in the first embodiment is omitted.

Figure 26:
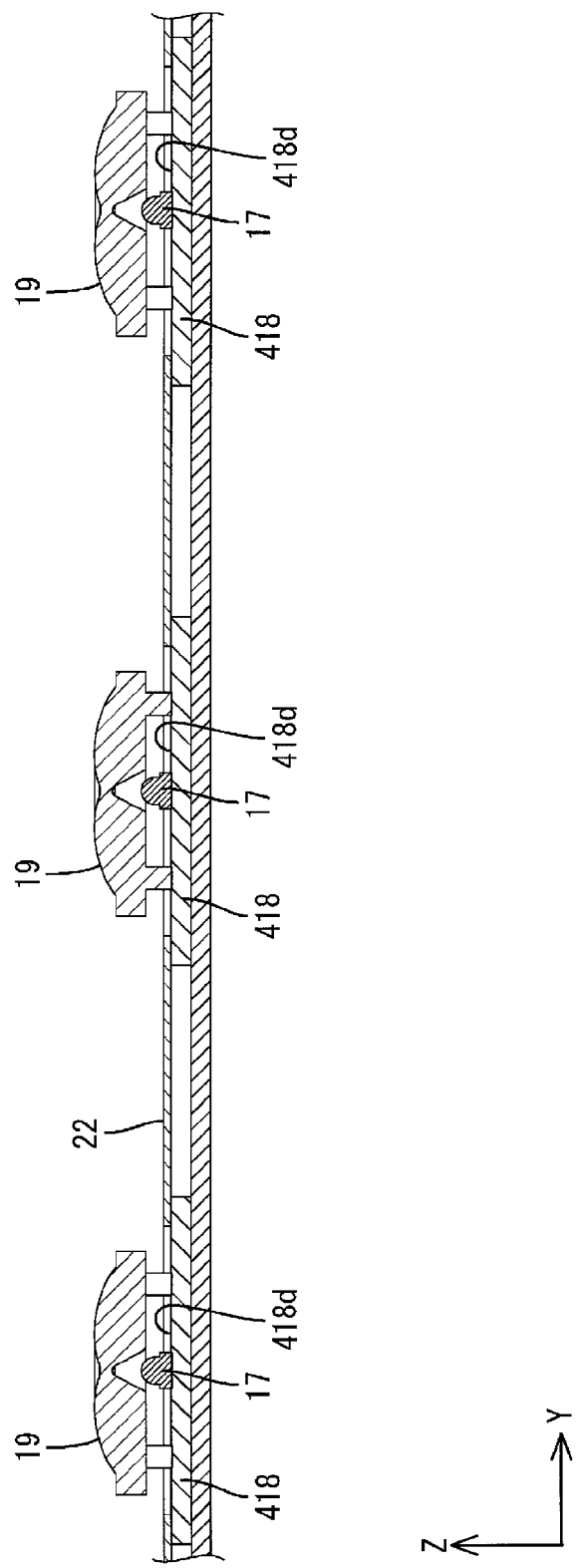
FIG. 26 is a sectional view showing a backlight unit according to a fifth embodiment of the present invention.
Figure 27:
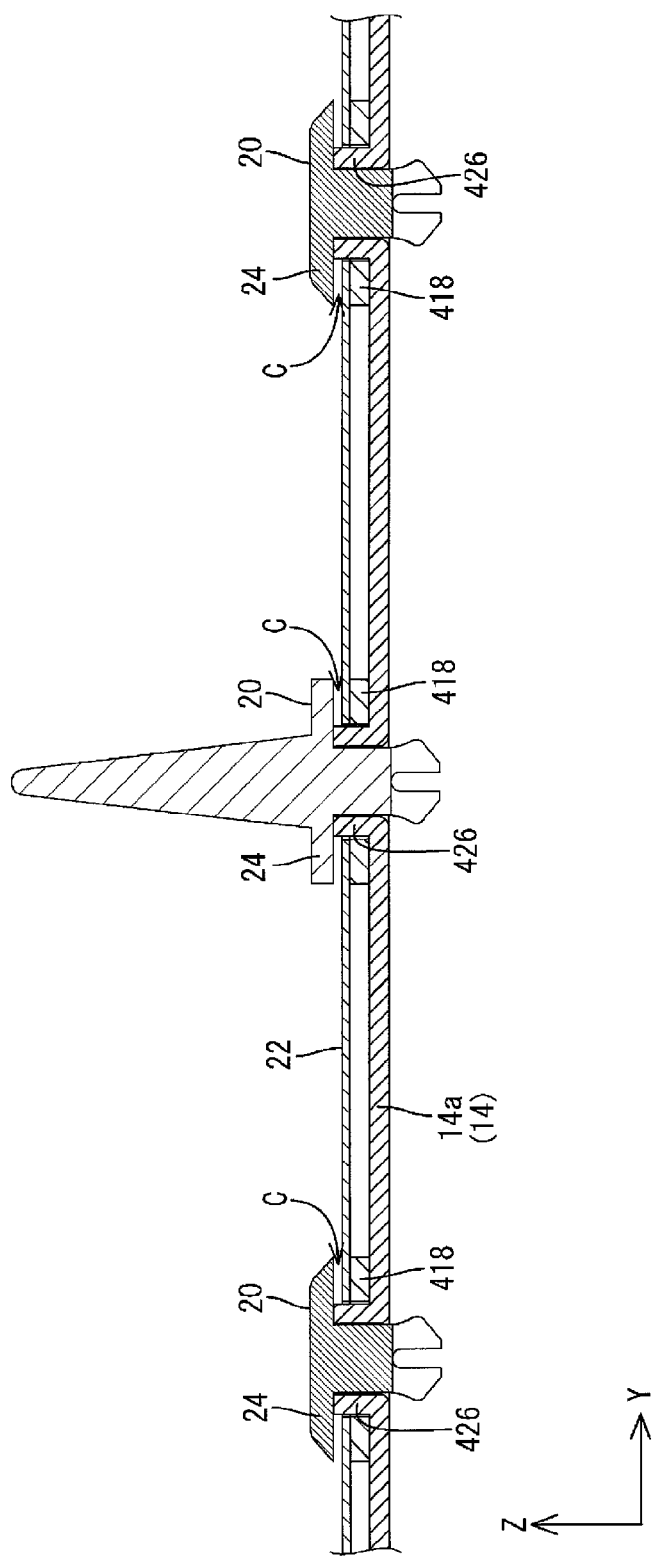
FIG. 27 is a sectional view showing the state where the holding members are attached to the chassis.

In this embodiment, the second reflection sheet 23 according to the first embodiment is omitted, and as shown in FIG. 26, a reflecting layer 418d in place of the second reflection sheet 23 is formed on the front side surface of an LED substrate 418. The reflecting layer 418d assumes a white color having excellent light reflectivity, and is formed, for example, by printing paste containing a metal oxide on the surface of the LED substrate 418. Screen printing and ink jet printing are preferable as printing means. Although the reflecting layer 418d can be formed on the almost all of the front side surface of the LED substrate 418, the reflecting layer 418d may be formed on a part opposite to the diffuser lenses 19 on the LED substrate 418. The reflecting layer 418d can reflect light returned from the diffuser lenses 19 toward the diffuser lenses 19 again. As shown in FIG. 27, only the first reflection sheet 22 is sandwiched between the body portion 24 of the holding member 20 and the LED substrate 418. A protruding dimension of a restricting part 426 from the bottom plate 14a of the chassis 14 is larger than a sum of thicknesses of the LED substrate 418 and the first reflection sheet 22, so that the gap C can be held between the body portion 24 and the first reflection sheet 22.

Sixth Embodiment

A sixth embodiment of the present invention will be described below with reference to FIG. 28. In the sixth embodiment, the diffuser lenses 19 and the second reflection sheet 23 in the first embodiment are omitted. Overlapping description of the same configuration, actions and effects as those in the first embodiment is omitted.

Figure 28:
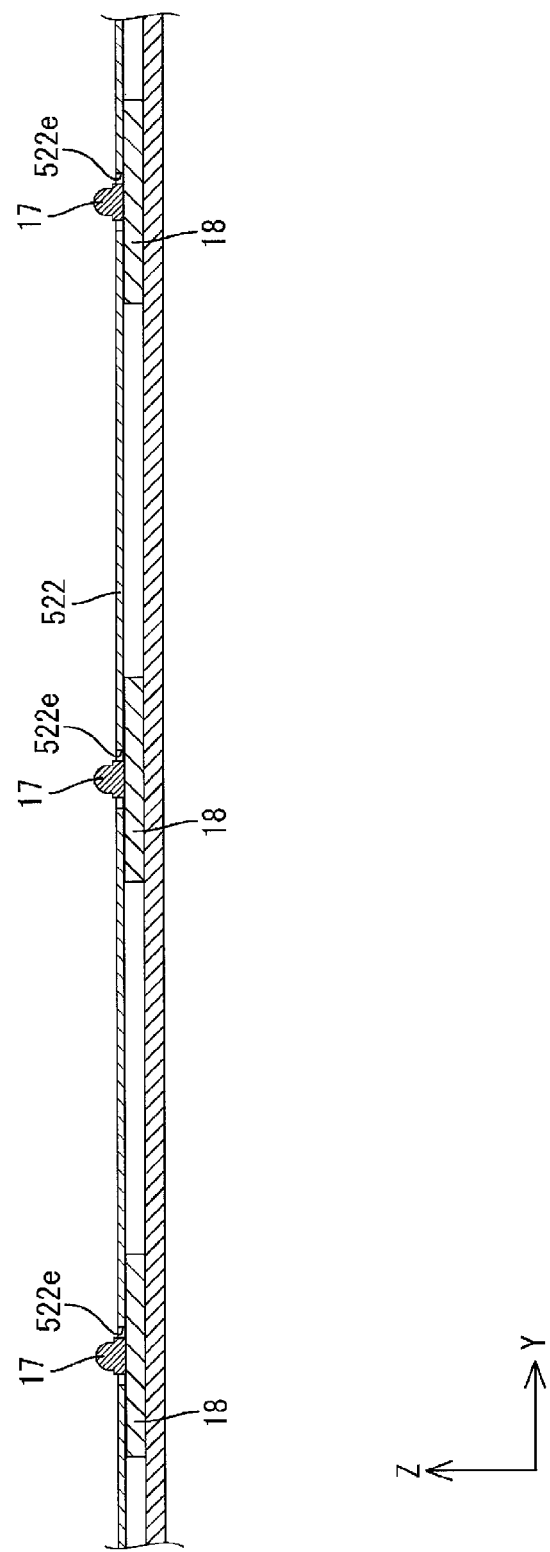
FIG. 28 is a sectional view showing a backlight unit according to a sixth embodiment of the present invention.

In this embodiment, since the diffuser lenses 19 and the second reflection sheet 23 in the first embodiment are omitted, light emitted from each of the LEDs 17, as shown in FIG. 28, directly reaches the optical member 15. A first reflection sheet 522 is provided with an opened LED insertion hole 522e that can pass each of the LEDs 17 therethrough (is smaller than the lens insertion hole 22b in the first embodiment) and can be placed directly on the LED substrate 18. In adopting this embodiment, since the region between the LEDs 17 is easy to be visually recognized as a dark place, in order to prevent unevenness brightness, it is preferred that the alignment pitch of the LEDs 17 in the X-axis direction and the Y-axis direction is smaller than that in the first embodiment.

Other Embodiment

The present invention is not limited to the embodiments described in the above description and figures, and for example, following embodiments fall within the technical scope of the present invention.

(1) Although the restricting part provided integrally with the chassis is in direct contact with the holding member in the first embodiment, the restricting part that is provided integrally with the chassis and is in indirect contact with the holding member also falls within the scope of the present invention. That is, technical matters in the first and second modification examples of the second embodiment can also be applied to the first embodiment. Specifically, by setting the diameter of the through hole of the first reflection sheet to be equal to that of the attachment hole and bringing the protruding end surface of the restricting part rising from the edge of the attachment hole into direct contact with the edge of the through hole of the first reflection sheet and into indirect contact with the body portion of the holding member, the gap may be held between the body portion and the second reflection sheet through the first reflection sheet. Further, by setting the diameter of each of the through holes of the first reflection sheet and the second reflection sheet to be equal to that of the attachment hole and bringing the protruding end surface of the restricting part rising from the edge of the attachment hole into direct contact with the edge of the through hole of the second reflection sheet and into indirect contact with the body portion of the holding member, the gap may be held between the body portion and the LED substrate through the first reflection sheet and the second reflection sheet. As a matter of course, the technical matters shown in the first and second modification examples of the second embodiment can be applied to the third to sixth embodiments.

(2) Also in embodiments other than each of the above-mentioned embodiments, specific shape of the restricting part can be changed appropriately. That is, although the restricting part is shaped like a circular endless ring or a rectangular endless ring in a plan view in each of the above-mentioned embodiment, the restricting part shaped like an elliptic endless ring or a ring having an end (C-like) in a plan view also falls within the scope of the present invention. The point or linear (linear, curved, and so on) restricting part in a plan view also falls within the scope of the present invention. A cylindrical, prismatic, conical or pyramid restricting part, or a restricting part having an angular (triangular), semicircular pr elliptic cross section also falls within the scope of the present invention.

(3) Although the restricting part is located adjacent to the fixed portion in a plan view in each of the above-mentioned embodiments, the restricting part located separately from the fixed portion in a plan view falls within the scope of the present invention. In this case, in the configuration where the restricting part is formed integrally with the holding member as in the second embodiment, the restricting part and the fixed portion are provided separately and independently. When the restricting part is located separately from the fixed portion, a through hole for passing the restricting part therethrough and a through hole for passing the fixed portion therethrough need to be provided independently at the extending members (the reflection sheets and the LED substrate).

(4) Although the fixed portion and the restricting part are located so as to overlap the reflection sheets and the LED substrate as the extending members in a plan view, and the through hole is provided in each of the reflection sheets and the LED substrate in each of the above-mentioned embodiments, for example, the fixed portion and the restricting part may be located so as not to overlap the LED substrate among the extending members in a plan view. In this case, the through hole on the LED substrate can be omitted. Similarly, the fixed portion and the restricting part may be located so as not to overlap the LED substrate and the second reflection sheet among the extending members in a plan view, and the through holes on the LED substrate and the second reflection sheet can be omitted.

(5) In addition to the case in (4) above, either of the fixed portion and restricting part may overlap the LED substrate (the LED substrate and the second reflection sheet) in a plan view and the other may not overlap the LED substrate (the LED substrate and the second reflection sheet) in a plan view.

(6) Although the restricting part is provided at either of the chassis or the holding member in each of the above-mentioned embodiments, the restricting part may be provided at both the chassis and the holding member. In this case, positional relationship of the holding member with respect to the extending member may be restricted by arranging the restricting parts so as to overlap each other in a plan view and bringing them into contact with each other.

(7) Although the two or three laminated "extending members" are held by the holding member in each of the above-mentioned embodiments, only one "extending member" or four or more "extending members" held together also falls within the scope of the present invention. As a specific example of holding only one "extending member", for example, the second reflection sheet and the LED substrate are omitted, and only the first reflection sheet is used as the "extending member" held by the holding member. In this case, it is preferable to use non-LED (for example, a cold-cathode tube and a hot-cathode tube) as the light source. As a specific example of holding the four "extending members", a sheet-like heat radiating member for promoting heat radiation is interposed between the LED substrate and the chassis, and the laminated reflection sheets, the LED substrate and the heat radiating member are held by the holding member together.

(8) Although the "extending member" including the reflection sheet is described in each of the above-mentioned embodiments, the extending member without the reflection sheet falls within the scope of the present invention.

(9) Although the "extending member" including the LED substrate is described in each of the above-mentioned embodiments, the extending member without the LED substrate falls within the scope of the present invention. In this case, a discharge tube such as the cold-cathode tube (linear light source) or a sheet-like light source such as an organic EL may be used as the light source.

(10) Although the reflection sheets and the LED substrate are used as the "extending members" in each of the above-mentioned embodiments, in the case where a sheet-like heat radiating member is interposed between the LED substrate and the chassis, the heat radiating member may be used as the "extending member".

(11) Although the two types of holding members are distinguished as the "single function-type" and the "complex function-type" in each of the above-mentioned embodiments, the "single function-type" does not mean that the holding member has no function other than the function of holding the extending member. The terms: "single function-type" and "complex function-type" are made on the basis of presence or absence of the function of supporting the optical member for convenience of explanation, and the "single function-type" holding member can have any function accompanying the above-mentioned holding function (e.g. a function of positioning with respect to the extending member) and other auxiliary functions.

(12) Also in embodiments other than each of the above-mentioned embodiments, the shape of the body portion of the holding member can be changed as appropriate. Specifically, the body portion shaped to be elliptic or quadrate (rectangular or square) in a plan view also falls within the scope of the present invention.

(13) Although the holding member is arranged between the adjacent LEDs on the LED substrate in each of the above-mentioned embodiments, the holding member located in a region overlapping the LED on the LED substrate in a plan view falls within the scope of the present invention. In this case, it is preferable to provide an insertion hole on the overlapping position of the holding member with the LED.

(14) Also in embodiments other than each of the above-mentioned embodiments, attachment position and the number of attached holding members with respect to each LED substrate can be changed as appropriate. Similarly, attachment position and the number of attached holding members with respect to chassis can be changed as appropriate.

(15) Although the plug-in type fixed portion is adopted as the attachment structure of the holding member to the chassis in each of the above-mentioned embodiments, slide-type may be adopted as the attachment structure. In an example of the slide-type attachment structure, by adopting a hook-type fixed portion, pushing the body portion toward the bottom plate of the chassis and then, sliding the body portion along the bottom plate, the hooked part of the fixed portion is engaged with the edge of the attachment hole.

(16) Although the fixed portion of the holding member is engaged passing through the chassis in each of the above-mentioned embodiments, the specific fixing method of the fixed portion to the chassis can be changed as appropriate. For example, configuration in which the attachment hole and the elastic engaged portion are omitted and a bottom part passing through the through hole of the LED substrate is fixedly attached to the inner wall surface of the chassis with the adhesive or the like falls within the scope of the present invention. In this case, means such as deposition and welding other than the adhesive can be adopted.

(17) Although the supporting portion and the body portion are located in the complex function-type holding member so as to be concentric with each other in each of the above-mentioned embodiments, the supporting portion located eccentric with the body portion also falls within the scope of the present invention. Further, arrangement in which the supporting portion and the fixed portion do not overlap each other in a plan view also falls within the scope of the present invention.

(18) Although the supporting portion of the complex function-type holding member is shaped like a tapered cone in each of the above-mentioned embodiments, for example, the supporting portion shaped like a tapered pyramid falls within the scope of the present invention. Further, the supporting portion is not necessarily tapered and the supporting portion shaped like a cylinder or prismatic column having a constant diameter also falls within the scope of the present invention.

(19) Although the supporting portion of the complex function-type holding member is in contact with the diffuser plate extending straight in the X-axis direction and the Y-axis direction in each of the above-mentioned embodiments, the supporting portion that is not in contact with the straight diffuser plate (specifically, the protruding front end of the supporting portion is located closer to the LED than the surface of the diffuser plate on the LED side) falls within the scope of the present invention. With such configuration, for example, even when the diffuser plate thermally expands due to change in the thermal environment in the backlight unit, the diffuser plate is allowed to be deformed so as to warp toward the LED in a clearance held between the diffuser plate and the supporting portion. Thereby, wrinkle or flexure is hard to occur in the diffuser plate and thus, unevenness brightness is also hard to occur in illumination light emitted from the diffuser plate.

(20) Although the supporting portion of the complex function-type holding member is point in the plane of the optical member in each of the above-mentioned embodiments, a linear or sheet-like supporting portion in the plane of the optical member also falls within the scope of the present invention.

(21) Although the single function-type holding member and the complex function-type holding member are concurrently used in each of the above-mentioned embodiments, configuration using only the single function-type holding member and configuration using only the complex function-type holding member falls within the scope of the present invention. Further, in concurrently using the single function-type holding member and the complex function-type holding member, the ratio of these members can be changed as appropriate.

(22) Although the color of the surface of the holding member is white in each of the above-mentioned embodiments, the color of the surface of the holding member may be, for example, creamy white or silver. Further, the color of the surface can be set by coating the surface of the holding member with a paint of desired color.

(23) Although the five-mounted type, the six-mounted type and the eight-mounted type of LED substrates are combined as appropriate in each of the above-mentioned embodiments, an LED substrate that mounts the number of LEDs other than five, six and eight LEDs falls within the scope of the present invention.

(24) Although the LED that includes the LED chip emitting only blue light and emits white light by means of the phosphor is used in each of the above-mentioned embodiments, an LED that includes the LED chip emitting only ultraviolet light and emits white light by means of the phosphor falls within the scope of the present invention.

(25) Although the LED that includes the LED chip emitting only blue light and emits white light by means of the phosphor is used in each of the above-mentioned embodiments, an LED that has three types of LED chips emitting R, G, B, respectively, falls within the scope of the present invention. Moreover, an LED that has three types of LED chips emitting C (cyan), M (magenta), Y (yellow), respectively, also falls within the scope of the present invention.

(26) Although the LED that emits white light in each of the above-mentioned embodiments, an LED that emits red light, an LED that emits blue light and an LED that emits green light may be combined as appropriate.

(27) Although the LED is used as the light source in each of the above-mentioned embodiments, a point light source other than the LED also falls within the scope of the present invention.

(28) Although the diffuser lens diffusing light from the LED is used in the first to fifth embodiments, an optical lens other than the diffuser lens (for example, a collective lens) falls within the scope of the present invention.

(29) Also in embodiments other than each of the above-mentioned embodiments, screen size and aspect ratio of the liquid crystal display device can be changed as appropriate.

(30) Although the liquid crystal panel and the chassis are arranged in the longitudinally mounted state so that the short-side direction matches the vertical direction in each of the above-mentioned embodiments, configuration in which the liquid crystal panel and the chassis are arranged in the longitudinally mounted state so that the long-side direction matches the vertical direction also falls within the scope of the present invention.

(31) Although the TFT is used as the switching component of the liquid crystal display device in each of the above-mentioned embodiments, the present invention can also be applied to a liquid crystal display device using a switching component (for example, a thin film diode (TFD)) other than TFT and the monochrome liquid crystal display device other than the color liquid crystal display device.

(32) Although the liquid crystal display device using the liquid crystal panel as the display panel is illustrated in each of the above-mentioned embodiments, the present invention can be applied to a display device using the other type of display panel.

(35) Although the television receiver provided with a tuner is illustrated in each of the above-mentioned embodiments, the present invention can be applied to a display device having no tuner.

The invention claimed is:

1. A lighting device, comprising:
   a light source;
   a chassis storing the light source therein;
   an extending member extending along an inner surface of the chassis;
   a holding member fixed to the chassis and holding the extending member to the chassis such that the extending member is sandwiched between the holding member and the chassis; and
   a restricting part restricting positional relationship of the holding member with respect to the extending member such that a gap is provided between the holding member and the extending member; wherein
   the extending member includes a light source substrate with the light source and a reflection member that reflects light from the light source, the light source substrate and the reflection member are overlaid and sandwiched between the holding member and the chassis;
   the reflection member is arranged on the light source substrate on the side opposite to the chassis, and has a light source insertion hole through which the light source is passed, the light source insertion hole that is provided at a position overlapping the light source in a plan view;
   a diffuser lens that diffuses light from the light source is arranged at a position overlapping the light source in a plan view on the light source substrate on the side opposite to the chassis; and
   the reflection member includes a first reflection member and a second reflection member, the first reflection member that has the light source insertion hole through which the diffuser lens can be passed, the second reflection member that is arranged between the light source substrate and the diffuser lens at a position overlapping the light source insertion hole of the first reflection member in a plan view, the second reflection member that reflects light toward the diffuser lens.

2. The lighting device according to claim 1, wherein the first reflection member and the second reflection member have configurations such that an edge of the light source insertion hole overlaps the second reflection member in a plan view.

3. A lighting device, comprising:
   a light source;
   a chassis storing the light source therein;
   an extending member extending along an inner surface of the chassis;
   a holding member fixed to the chassis and holding the extending member to the chassis such that the extending member is sandwiched between the holding member and the chassis; and
   a restricting part restricting positional relationship of the holding member with respect to the extending member such that a gap is provided between the holding member and the extending member; wherein:
   the holding member includes a body portion and a fixed portion, the body portion holds the extending member with the chassis such that the extending member is sandwiched between the body portion and the chassis, the fixed portion that protrudes from the body portion toward the chassis and is fixed to the chassis;
   the fixed portion includes an elastic engaged portion that is elastically deformable and is engaged on the side opposite to the extending member through the chassis; and
   the holding member includes a first component and a second component, the first component that includes the body portion and the fixed portion, the second component that is attached to the first component and restricts elastic deformation of the elastic engaged portion.

* * * * *